US010966151B2

(12) United States Patent
Park et al.

(10) Patent No.: US 10,966,151 B2
(45) Date of Patent: Mar. 30, 2021

(54) INSTANT TETHERING AND AUTO-CONNECTING DEVICES USING WAKE-UP RADIO (WUR) COMMUNICATIONS

(71) Applicant: Intel Corporation, Santa Clara, CA (US)

(72) Inventors: Minyoung Park, San Ramon, CA (US); Ehud Reshef, Kiryat Tivon (IL); Po-Kai Huang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/728,021

(22) Filed: Dec. 27, 2019

(65) Prior Publication Data

US 2020/0145923 A1 May 7, 2020

(51) Int. Cl.
| | |
|---|---|
| *H04W 52/02* | (2009.01) |
| *H04W 40/24* | (2009.01) |
| *H04W 80/02* | (2009.01) |
| *H04W 4/80* | (2018.01) |
| *H04W 76/11* | (2018.01) |
| *H04W 84/12* | (2009.01) |

(52) U.S. Cl.
CPC ......... *H04W 52/0229* (2013.01); *H04W 4/80* (2018.02); *H04W 40/244* (2013.01); *H04W 76/11* (2018.02); *H04W 80/02* (2013.01); *H04W 84/12* (2013.01)

(58) Field of Classification Search
CPC ... H04W 52/0229; H04W 4/80; H04W 76/11; H04W 40/244; H04W 80/02; H04W 84/12
USPC ................................. 370/329, 328, 338, 335
See application file for complete search history.

(56) References Cited

U.S. PATENT DOCUMENTS

| | | | |
|---|---|---|---|
| 8,792,448 B2 * | 7/2014 | Nix ........................ | H04L 1/0026 370/329 |
| 2013/0235770 A1 * | 9/2013 | Merlin .............. | H04W 52/0238 370/311 |
| 2016/0081132 A1 * | 3/2016 | Lee ........................ | H04W 76/10 370/338 |
| 2019/0149443 A1 * | 5/2019 | Gunasekara ........ | H04L 43/0817 370/252 |

* cited by examiner

*Primary Examiner* — Nghi H Ly
(74) *Attorney, Agent, or Firm* — Schwegman Lundberg & Woessner, P.A.

(57) ABSTRACT

Methods, apparatus, and computer-readable media are described to detect, by processing circuitry of a station (STA), a communication link (e.g., of a primary connectivity radio) of the STA is unavailable. A wake-up radio (WUR) packet is encoded for transmission to a second STA based on unavailability of the communication link. The WUR packet includes a command to enable a wireless hotspot of the second STA. A beacon signal received from the second STA is decoded. The beacon signal includes a service set identifier (SSID) of the wireless hotspot enabled by the second STA. A data packet is encoded for transmission to the second STA based on the SSID of the wireless hotspot.

25 Claims, 17 Drawing Sheets

INSTANT TETHERING AND AUTO-CONNECTING DEVICES USING WAKE-UP RADIO (WUR) COMMUNICATIONS

TECHNICAL FIELD

Various embodiments generally may relate to the field of wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer-readable media, and apparatus for instant tethering or auto-connection devices using wake-up radio (WUR) communications.

BACKGROUND

The efficient use of the resources of a wireless local-area network (WLAN) and individual wireless devices is important to provide bandwidth and acceptable response times to the users of the WLAN. However, often there are many devices trying to share the same resources and some devices may be limited by the communication protocol they use or by their hardware bandwidth. Moreover, a wireless device may be configured for using communication resources of one or more other devices (e.g., for tethering or data synchronization), but such configurations may be time-consuming and require user involvement.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments set forth in the claims encompass all available equivalents of those claims.

Aspects of the disclosure relate to providing instant tethering (e.g., using a device, such as a smartphone, like a modem) between wireless devices using WUR communications. More specifically, a WUR frame can be used to automatically trigger tethering by enabling a wireless hotspot provided by one of the devices. Additional aspects of the disclosure relate to using WUR communications to configure and manage the auto-connecting of peripheral devices (e.g., to perform synchronization or other types of data communication).

Figure 1:
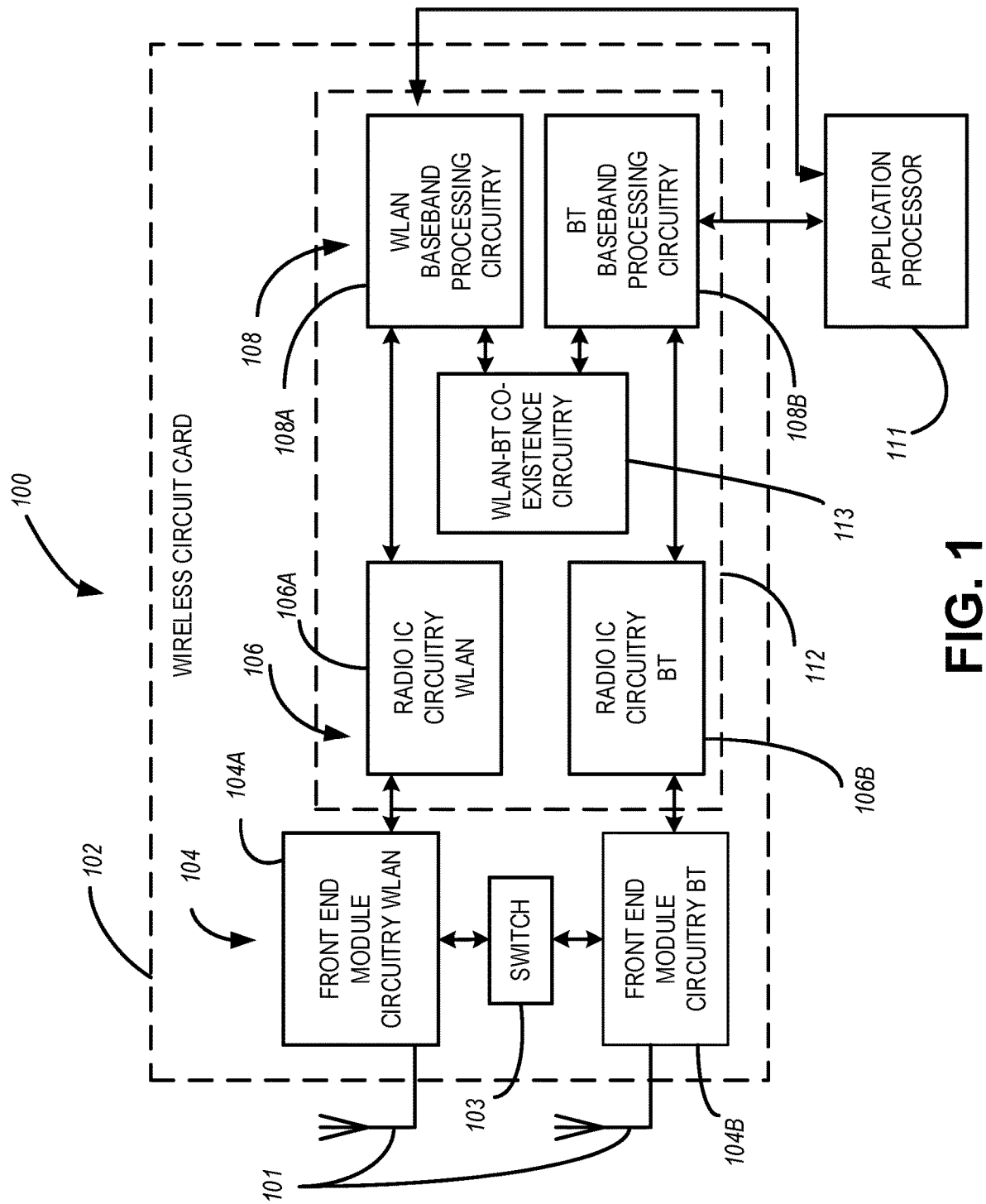
FIG. 1 is a block diagram of a radio architecture, in accordance with some embodiments.

FIG. 1 is a block diagram of a radio architecture 100 in accordance with some embodiments. The radio architecture 100 may be implemented in a master device coupled to a LE HID-type device or another type of slave device. The radio architecture 100 may include radio front-end module (FEM)

circuitry 104, radio IC circuitry 106, and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 102, to amplify the received signals and to provide the amplified versions of the received signals to the BT radio IC circuitry 106B for further processing. The FEM circuitry 104A may also include a transmit signal path which may include circuitry configured to amplify WLAN signals provided by the radio IC circuitry 106A for wireless transmission by one or more of the antennas 101. In addition, the FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. The BT radio IC circuitry 106B may, in turn, include a receive signal path which may include circuitry to down-convert BT RF signals received from the FEM circuitry 104B and provide baseband signals to BT baseband processing circuitry 108B. The WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. The BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform (FFT) or Inverse Fast Fourier Transform (IFFT) block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with the application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

Figure 8:
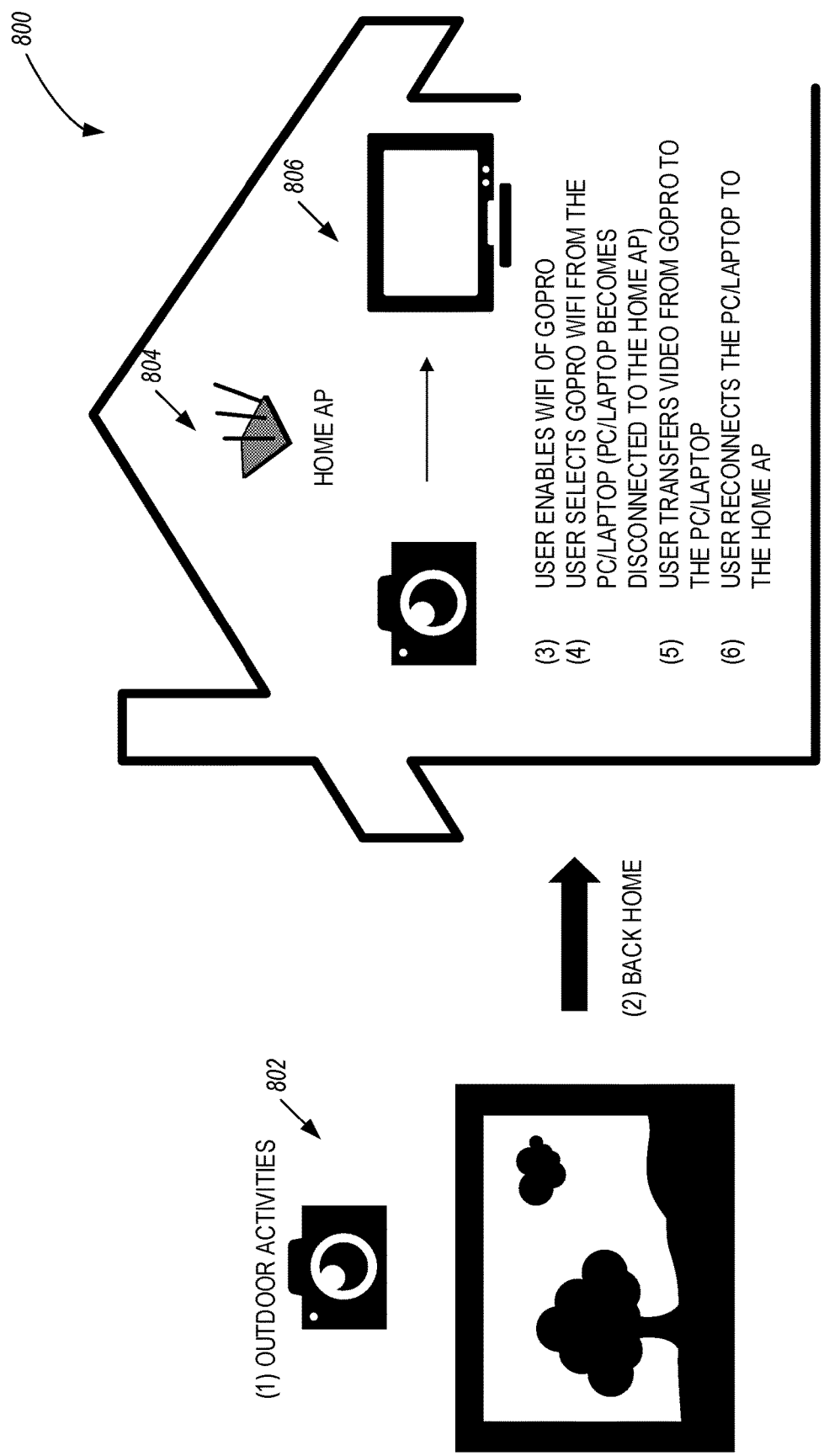
FIG. 8 illustrates an example communication sequence for connection to a peripheral device, in accordance with some embodiments.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers. In some embodiments, the wireless radio card 102 may include a platform controller hub (PCH) system-on-a-chip (SOC) and a central processing unit (CPU)/host SOC. Example embodiments of a PCH SOC and CPU SOC in connection with the discussed techniques are illustrated in FIG. 8.

In some of these multicarrier embodiments, radio architecture 100 may be part of a Wi-Fi communication station (STA) such as a wireless access point (AP), a base station, or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, IEEE 802.11-2016, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection-oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies, however.

Figure 2:
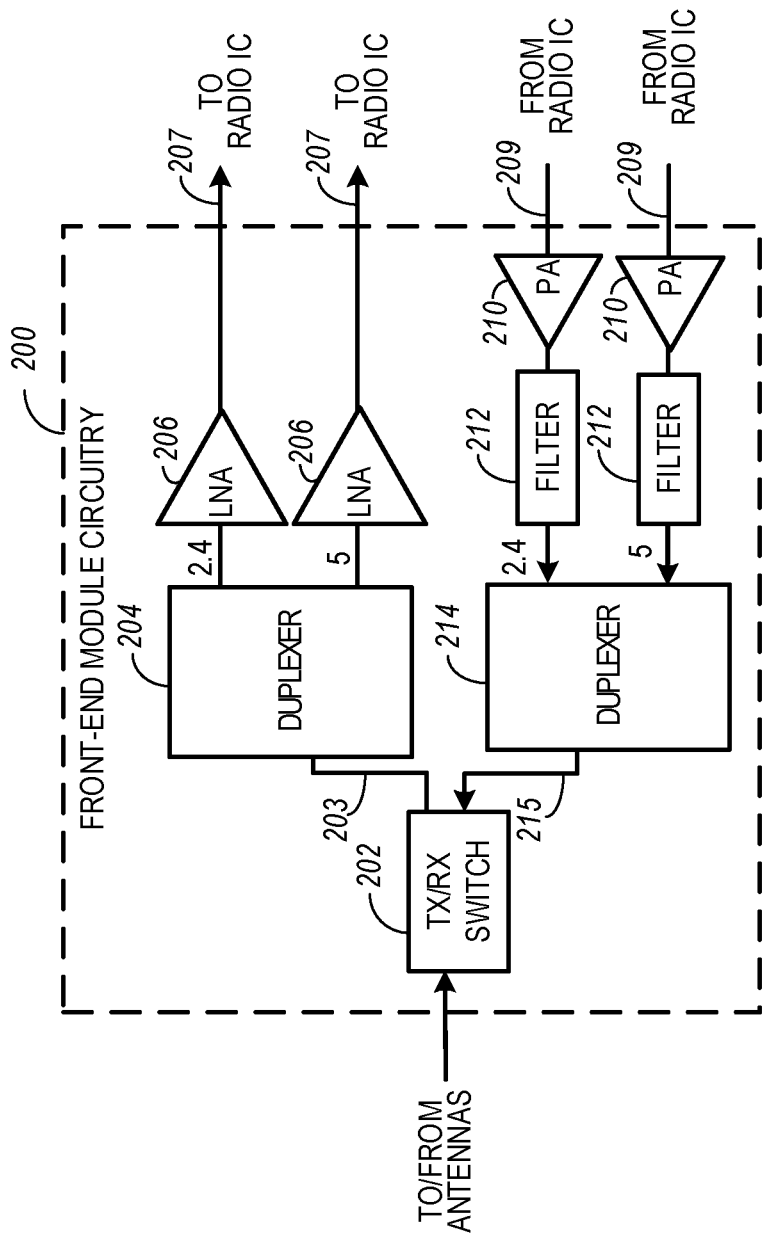
FIG. 2 illustrates a front-end module circuitry for use in the radio architecture of FIG. 1, in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit (TX) mode and receive (RX) mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, an LPF or another type of filter for each frequency spectrum, and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHz signal paths and may utilize the same FEM circuitry 200 as the one used for WLAN communications.

Figure 3:
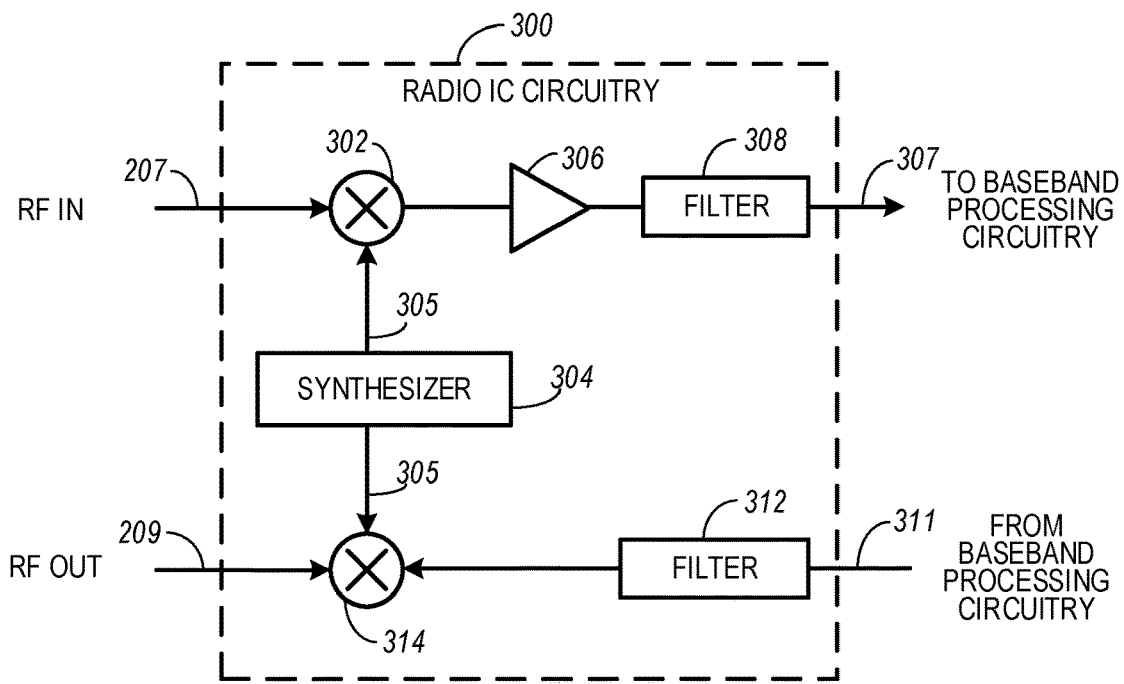
FIG. 3 illustrates a radio IC circuitry for use in the radio architecture of FIG. 1, in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include an LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include an LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature-phase (Q) paths). In such an embodiment, RF input signal 207 from FIG. 2 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in the duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature-phase (Q) path) may operate at a 25% duty cycle, which may result in a significant reduction in power consumption.

The RF input signal 207 (FIG. 2) may comprise a balanced signal, although the scope of the embodiments is not limited in this respect. The I and Q baseband output signals may be provided to the low-noise amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include an analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
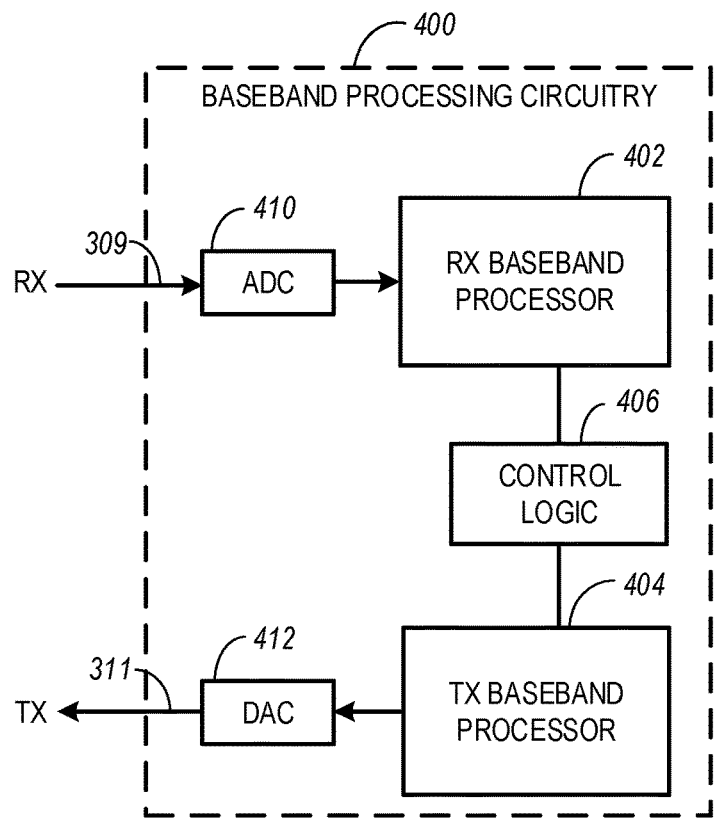
FIG. 4 illustrates a baseband processing circuitry for use in the radio architecture of FIG. 1, in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
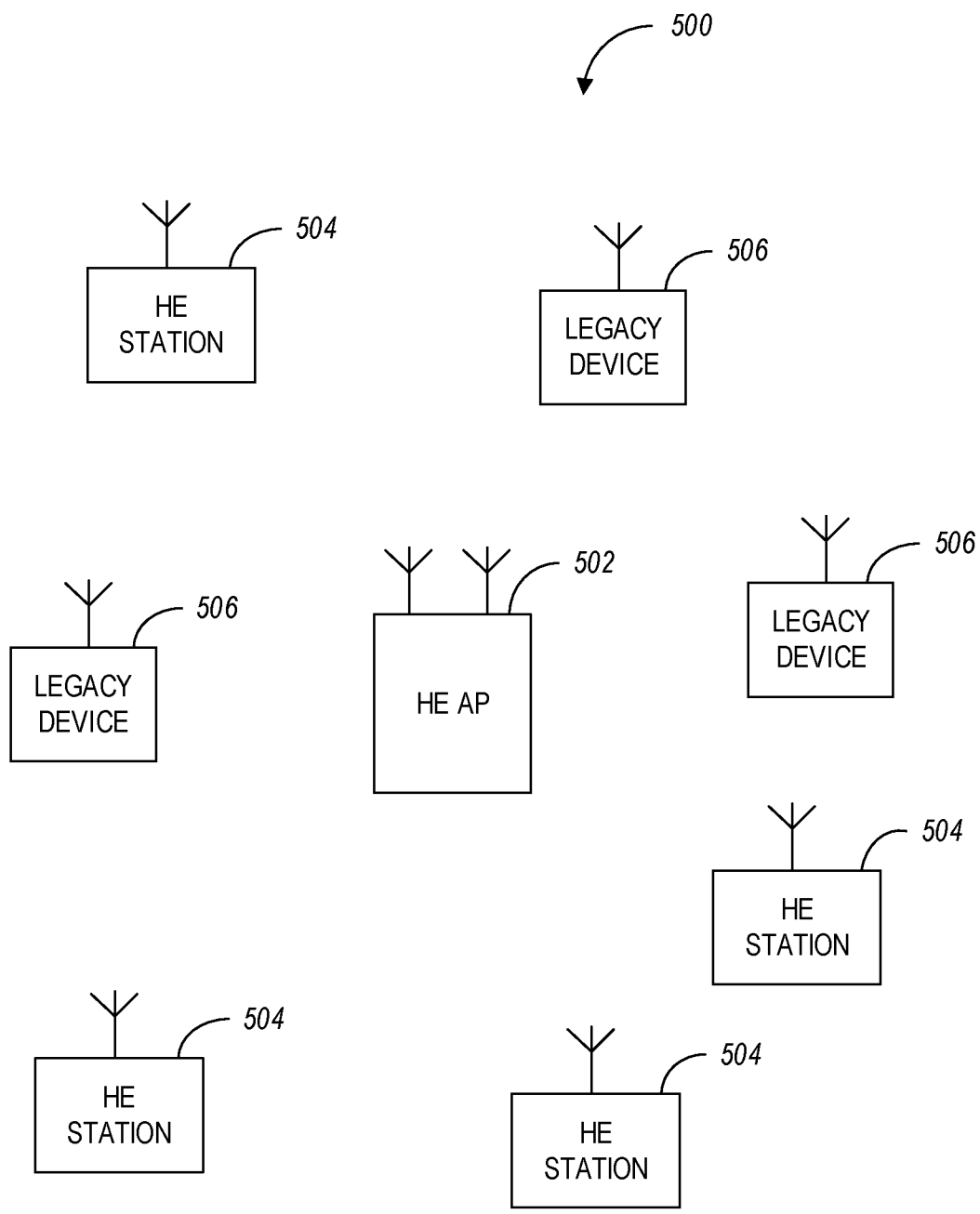
FIG. 5 illustrates a WLAN, in accordance with some embodiments.

FIG. 5 illustrates a WLAN 500 in accordance with some embodiments. The WLAN 500 may comprise a basic service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

In some aspects, the AP 502 can include a master device in station 504 can include a slave device. For example, the AP 502 can include a computing device such as a wired or wireless device configured to perform one or more of the techniques discussed herein. The station 504 can be configured as a slave device to the AP 502 and can include LE HID types of devices or another type of wired or wireless device that is coupled to the AP 502 in a slave configuration.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a Physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments, the bandwidth of the channels may be based on a number of active data subcarriers. In some embodiments, the bandwidth of the channels is based on 26, 52, 106, 242, 484, 996, or 2×996 active data subcarriers or tones that are spaced by 20 MHz. In some embodiments, the bandwidth of the channels is 256 tones spaced by 20 MHz. In some embodiments, the channels are multiple of 26 tones or a multiple of 20 MHz. In some embodiments, a 20 MHz channel may comprise 242 active data subcarriers or tones, which may determine the size of a Fast Fourier Transform (FFT). Allocation of bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz, and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g., IEEE 802.11ax embodiments, a HE AP 502 may operate as a master station which may be arranged to contend for a wireless medium (e.g., during a contention period) to receive exclusive control of the medium for a HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than multiple access techniques. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments, the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of the trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments, the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-13.

In example embodiments, the HE station 504 and/or the HE AP 502 are configured to perform the methods and operations/functions described herein in conjunction with FIGS. 1-18. In example embodiments, an apparatus of the HE station 504 and/or an apparatus of the HE AP 502 are configured to perform the methods and functions described herein in conjunction with FIGS. 1-18. The term Wi-Fi may refer to one or more of the IEEE 802.11 communication standards. AP and STA may refer to HE access point 502 and/or HE station 504 as well as legacy devices 506.

In some embodiments, a HE AP 502 or a HE STA 504 performing at least some functions of a HE AP 502 may be referred to as HE AP STA. In some embodiments, a HE STA 504 may be referred to as a HE non-AP STA. In some embodiments, a HE STA 504 may be referred to as either a HE AP STA and/or HE non-AP.

Figure 6:
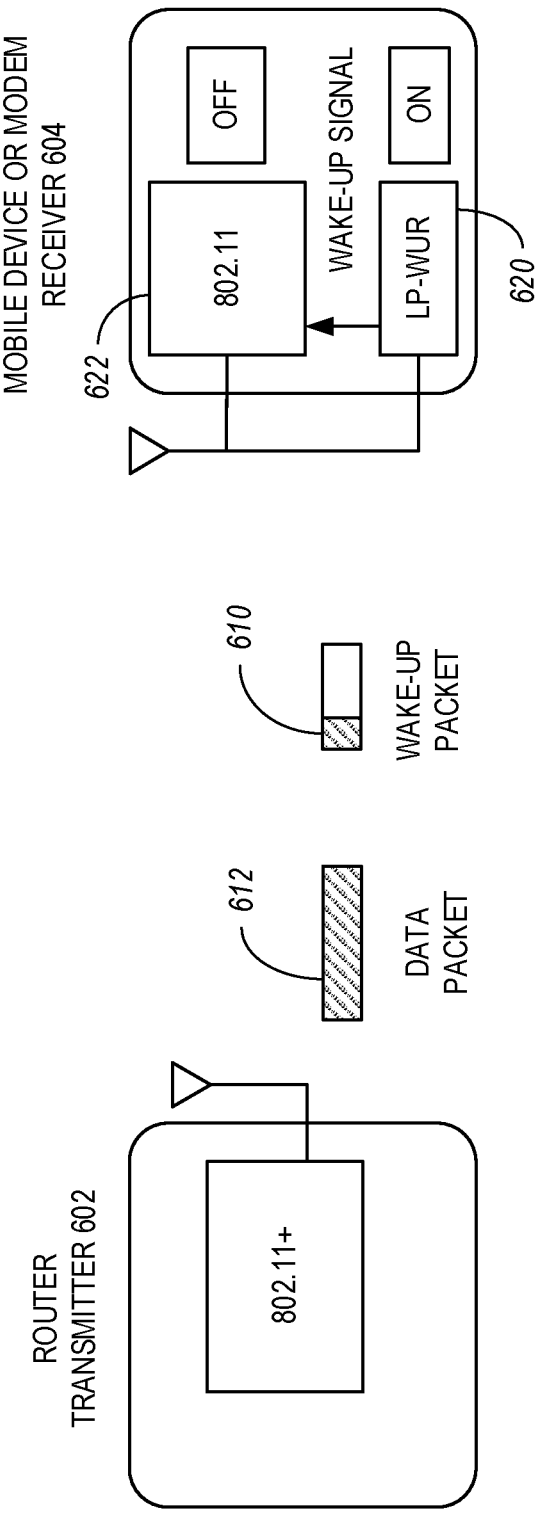
FIG. 6 illustrates an example of a low power wake-up receiver (LP-WUR) for a Wi-Fi device, in accordance with some embodiments.

In some embodiments, a low power wake up receiver (LP-WUR) enables an ultra-low power mode of operation for a Wi-Fi device. In some embodiments, systems/devices/methods described below provide for a device to have a minimum radio configuration that can receive a wake-up packet from a peer and perform functions (e.g., configure tethering, auto-connection, data synchronization, etc.) associated with wireless communications and based on information within the WUR packet. Once the wake-up packet is received, the device may wake up a transceiver, e.g., a primary connectivity radio, that may be used to send and receive data. Hence, the device can stay in low power mode until receiving the wake-up packet. An example system including a Wi-Fi, i.e., (802.11) device is shown in FIG. 6, which illustrates an example of a low power wake-up receiver (LP-WUR) 620 for Wi-Fi, e.g. (IEEE 802.11) device 604, in accordance with some embodiments. The device 604 includes the LP-WUR 620 as well as a primary connectivity radio 622. The device 604 may operate in a low power mode where the primary connectivity radio 622 is powered off. In some embodiments, the state of the primary connectivity radio 622, as viewed from a transmitter 602, is off in the low power mode. The primary connectivity radio 622 may send and receive data while the device 604 is in low power mode.

In an example, when the transmitter 602 wants to wake up the device 604, the transmitter sends a wake-up packet 610 to the LP-WUR 620. Upon receipt, the LP-WUR sends a wake-up signal to a controller or directly to the primary connectivity radio 622. The primary connectivity radio 622 may then power up to be able to receive data, e.g., a data packet 612. In an example, the wake-up packet 610 may be sent based upon a duty cycle or based upon when the transmitter 602 needs to send data to the device 604.

In some embodiments, systems/devices/methods described herein may provide additional signaling to indicate the wake-up receiver (WURx) state transition, which can be independent of the existing transition for power states and power management modes. The WURx may operate in various power management modes that may be used to determine the state of the WURx. In an example, the WURx state may be always on or in duty-cycle mode. In duty-cycle mode, the WURx cycles between being active for a period of time and inactive for a period of time. Additional signaling may be introduced from the STA to AP to indicate the transition of power management mode and/or WURx state.

The different power management modes for the WURx may have different corresponding rules for the WURx state transition. In an example, the rules may follow the definition of power management mode for an 802.11 radio. In an example, the WURx state transition is viewed from the AP's perspective and may not be the actual WURx state of the STA since the STA may go through the localized operation of WURx state.

In various example, an STA can be in one of two power states: awake or doze. In the awake state, the STA is fully powered. For example, the primary connectivity radio may be fully powered to send/receive data. The WURx, however, may be powered off in the awake state. In the doze state, the primary connectivity radio may be powered off. From the perspective of the AP, the AP assumes the STA is not able to send or receive data, other than receive a wake-up packet.

A non-AP STA can be in one of two power management modes: active mode or power save mode. In the active mode, the STA may receive and transmit frames at any time. In active mode, the STA remains in the awake state. In the power save mode, the STA enters the awake state to receive or transmit data/frames. The STA returns and remains in the doze state, otherwise.

In various embodiments, the AP has the capability to send the wake-up packet to the WURx of the STA to wake up the primary connectivity radio of the STA. The concept, however, may be extended to the general device-to-device model, where STA1 has the capability to send the wake-up packet to the WURx of the STA2 to wake up the primary connectivity radio of the STA2. In some embodiments, systems/devices/methods described herein can provide two power management modes and introduce signaling to indicate the transition of power management modes and/or states of the WURx to STA1. In some embodiments, the WURx of an STA may be in one of two power states. In a WURx awake state, the STA may receive wake-up receiver transmission, such as wake-up packets and/or beacons. In a WURx doze state, the STA does not receive wake-up receiver transmissions. For example, the WURx may be powered off to conserve power.

In some embodiments, the WURx of an STA may be operated in one of two power management modes. In a WURx active mode, the STA remains in the WURx awake state to receive wake-up receiver transmissions. In the WURx power save mode, the STA enters the WURx awake state to receive wake-up receiver transmissions, and then otherwise remains in the WURx doze state.

Even though techniques discussed herein mention a primary connectivity radio and a wake-up radio (e.g., radios 620 and 622 illustrated in FIG. 6) that are separate, the disclosure is not limited in this regard. More specifically, a wireless device may use a single radio that is configured to perform the functionalities discussed herein associated with both the primary connectivity radio and the wake-up radio (e.g., the functionalities discussed in connection with instant tethering and auto-connection). For example, device 622 may include only one radio which performs the functionalities and techniques discussed herein associated with a primary connectivity radio and a wake-up radio.

In some embodiments, systems/devices/methods described herein provide rules to define the WURx state transition. In some embodiments, the WURx state transition is defined from the perspective of the other side, e.g., AP. In some embodiments, the STA may do localized operations even when the AP believes the WURx to be in a doze state. For example, if from the AP's perspective, the WURx is off, the STA may keep the WURx powered on to simplify the operation. In an example, the STA may not need to notify the AP. Specifically, when the STA is in the doze state from the AP's perspective, the STA may be in an awake state to deal with other operations. As another example, when the STA is in the awake state from AP's perspective, the STA may be in doze due to mechanisms like intra-BSS PPDU power save.

In some embodiments associated with device-to-device communication, STA1 may send a wake-up packet to STA2, whether the wake-up packet can include at least one command for STA2. For example, the wake-up packet can include an enable hotspot command so that STA2 can enable a wireless hotspot using its primary connectivity radio (e.g., 622). Wake-up packet can include a disable hotspot command so that STA2 can disable the wireless hotspot at the request of STA1 (e.g., went wireless connectivity to an access point is available to both STA1 and STA2 in each device can use its own primary connectivity radio to connect to the access point). In some aspects, the wake-up packet can also include a connect and synchronize command, whereby STA1 can automatically connect and synchronize data with STA2. Additional details regarding the usage of wake-up packets to facilitate instant tethering and auto-connecting are disclosed in FIG. 7-FIG. 16.

Figure 7:
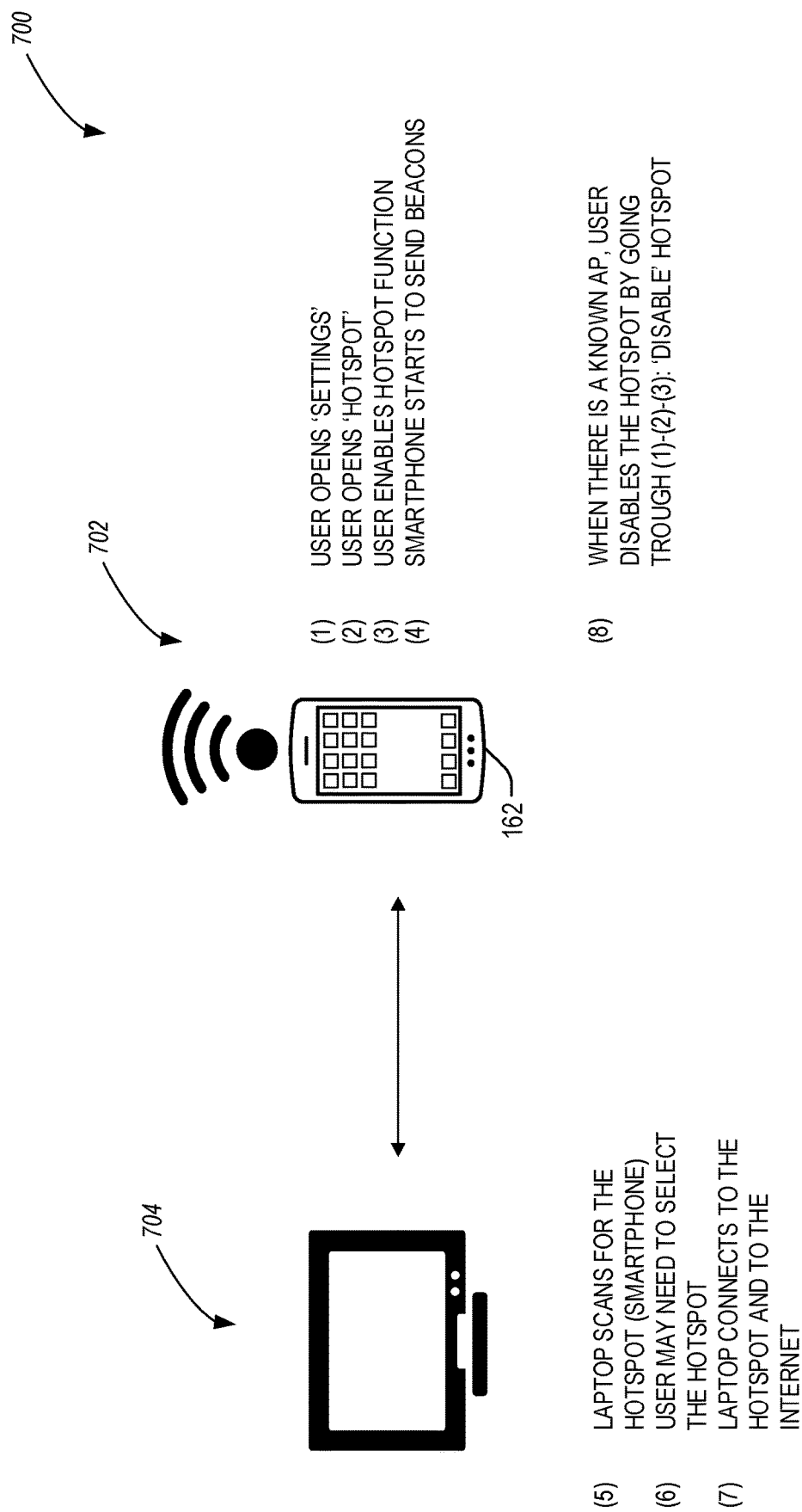
FIG. 7 illustrates an example communication sequence between two wireless devices to enable and use tethering, in accordance with some embodiments.

FIG. 7 illustrates an example communication sequence 700 between two wireless devices to enable and use tethering, in accordance with some embodiments. Referring to FIG. 7, the example communication sequence 700 takes place between a first device (STA1) 704 and a second device (STA2) 702. In some aspects, STA1 may be a laptop and STA2 may be a smartphone.

When a user of the laptop 704 is out of Wi-Fi coverage and wants to use the smartphone 702 to connect to the Internet through the LTE connection capabilities of the smartphone 702 by enabling the hotspot feature (tethering) (or to use another device's pre-configured Wi-Fi), the user needs to go through a number of steps to enable the wireless hotspot of STA2. For example and as illustrated in FIG. 7, the user has to perform the following: open the settings menu, open the hotspot menu, and enable the hotspot functionality. STA2, upon enabling the wireless hotspot, starts to communicate beacons with the service set identifier (SSID) of the wireless hotspot. Laptop 704 may scan for the wireless hotspot as well as any beacons. The user may need to select a hotspot from the laptop 704, and the laptop may connect to the wireless hotspot and to the Internet using a smartphone 702 LTE connection. When there is a known access point, the user may disable the hotspot at the smartphone 702 by repeating the initial steps and disabling the hotspot from the smartphone menus and settings.

Another example is wirelessly connecting a PC or laptop to a peripheral device, such as a GoPro camera, when a user is coming back from a trip and wants to transfer a video to the PC/laptop. In conventional use cases, a user has to go through a number of steps to transfer a video file to the PC/laptop, as shown in connection with FIG. 8.

FIG. 8 illustrates an example communication sequence 800 for connection to a peripheral device, in accordance with some embodiments. Referring to FIG. 8, camera 802 (STA1) may be used for outdoor activities and after the user returns to a home location (including a home access point 804, or STA2, and a laptop 806, or STA3), the user may enable a Wi-Fi access point on the camera 802. The user may then select the camera access point from the laptop 806, while the laptop 806 becomes disconnected from the home access point 804. The user may then transfer data (e.g., photos and videos) from the camera 802 to the laptop 806. The user then disconnects from the camera 802 and reconnects the laptop 806 to the home AP 804.

As illustrated in FIG. 7 in FIG. 8, conventional tethering techniques and peripheral device connection and synchronization techniques are time-consuming and require multiple user-initiated steps with little to no automation. Other conventional techniques include Chrome OS and some versions of Android devices support a feature called "instant tethering", which uses Bluetooth radio that shows the availability of hotspots from the user's Android smartphone. This feature, however, requires both devices to be signed in to the user's Google account and the Bluetooth radios of both devices have to be turned on. In this regard, these conventional techniques still require user intervention and cause additional power consumption due to the Bluetooth radios being turned on. There is no known solution for connecting a GoPro-type of peripheral devices to a PC/laptop without user intervention.

In some aspects, disclosed techniques may be used to enable instant tethering between two devices (e.g., a laptop and a smartphone) without user intervention at low power consumption using wake-up radio (WUR) functionalities when the devices are out of Wi-Fi coverage. For example, when a user is out of Wi-Fi coverage, the laptop may transmit a WUR frame with a command "enable hotspot" to the smartphone. The smartphone enables the wireless hotspot feature when it receives the WUR frame with the command "enable hotspot." When the user is back in the Wi-Fi coverage, the laptop may transmit another WUR frame with the command "disable hotspot." The smartphone disables the hotspot feature when it receives the WUR frame with the command "disable hotspot." In this regard, tethering functionalities such as enabling or disabling a wireless hotspot can be performed automatically and without user intervention.

While the above use case is depicted as between a wireless hotspot on a smartphone and a laptop, the disclosure is not limited in this regard and the discussed techniques could extend the use case to any two devices, where one is able to (but does not usually enable) support an AP interface with connection to the network, and the other device needs to access the network but is not able to achieve this without a mediator device.

In some aspects, disclosed techniques may also be used to configure the instant connection to peripheral devices as detailed in the following examples as well as in connection with FIG. 11, FIG. 12, and FIG. 13. A home AP (or a laptop) may transmit a WUR beacon or WUR discovery frame. When a user brings a peripheral device (e.g., a GoPro camera) within the range of the home AP or laptop, the peripheral device receives the WUR beacon/discovery frame and transmits a WUR frame with command "synchronize" (or "sync") to another device such as the user's home desktop/laptop/home network-attached storage (Home-NAS), etc. in this regard, the peripheral device uses the WUR frame to sync with the home PC/laptop without user intervention.

Figure 9:
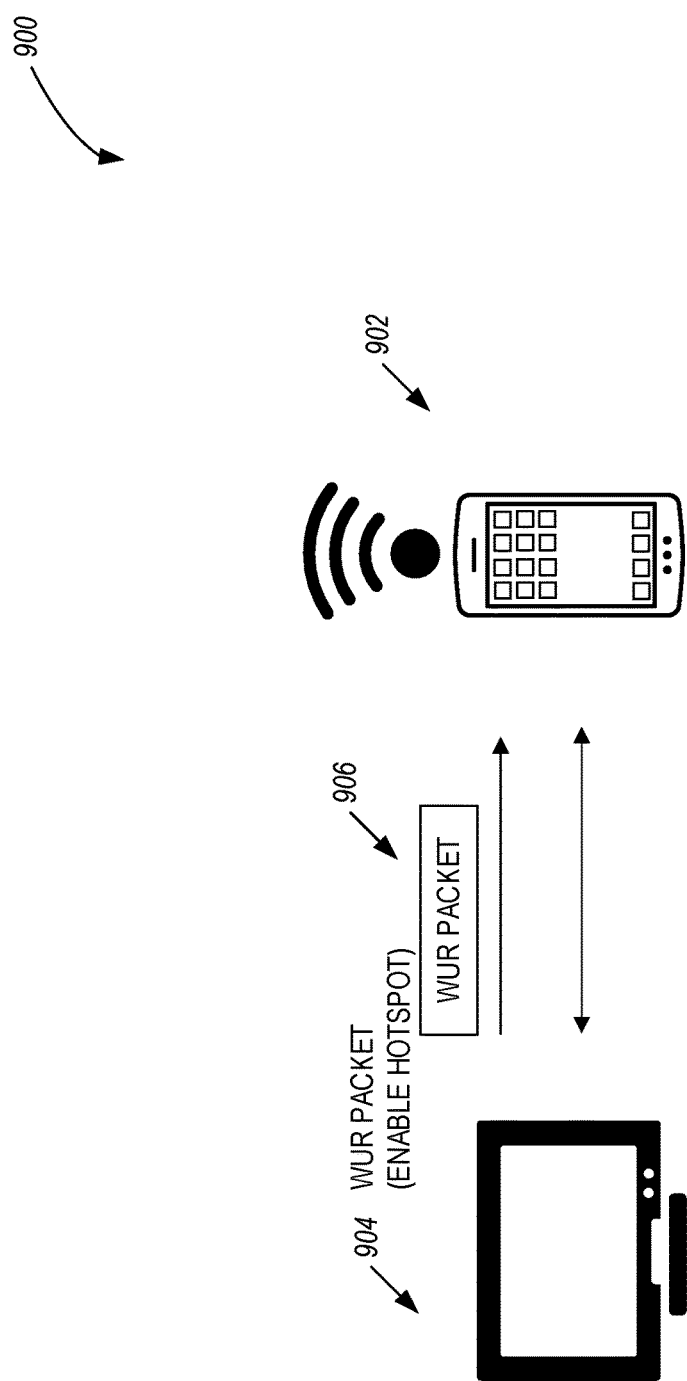
FIG. 9 illustrates an example communication sequence between two wireless devices using WUR communications, in accordance with some embodiments.

FIG. 9 illustrates an example communication sequence 900 between two wireless devices using WUR communications, in accordance with some embodiments. Referring to FIG. 9, the example communication sequence 900 can take place between a first device (STA1) 804 and a second device (STA2) 902. In some aspects, STA1 may be a laptop and STA2 may be a smartphone. In some aspects, STA2 may be referred to as an access point (AP) as it will be providing a wireless hotspot.

Figure 10:
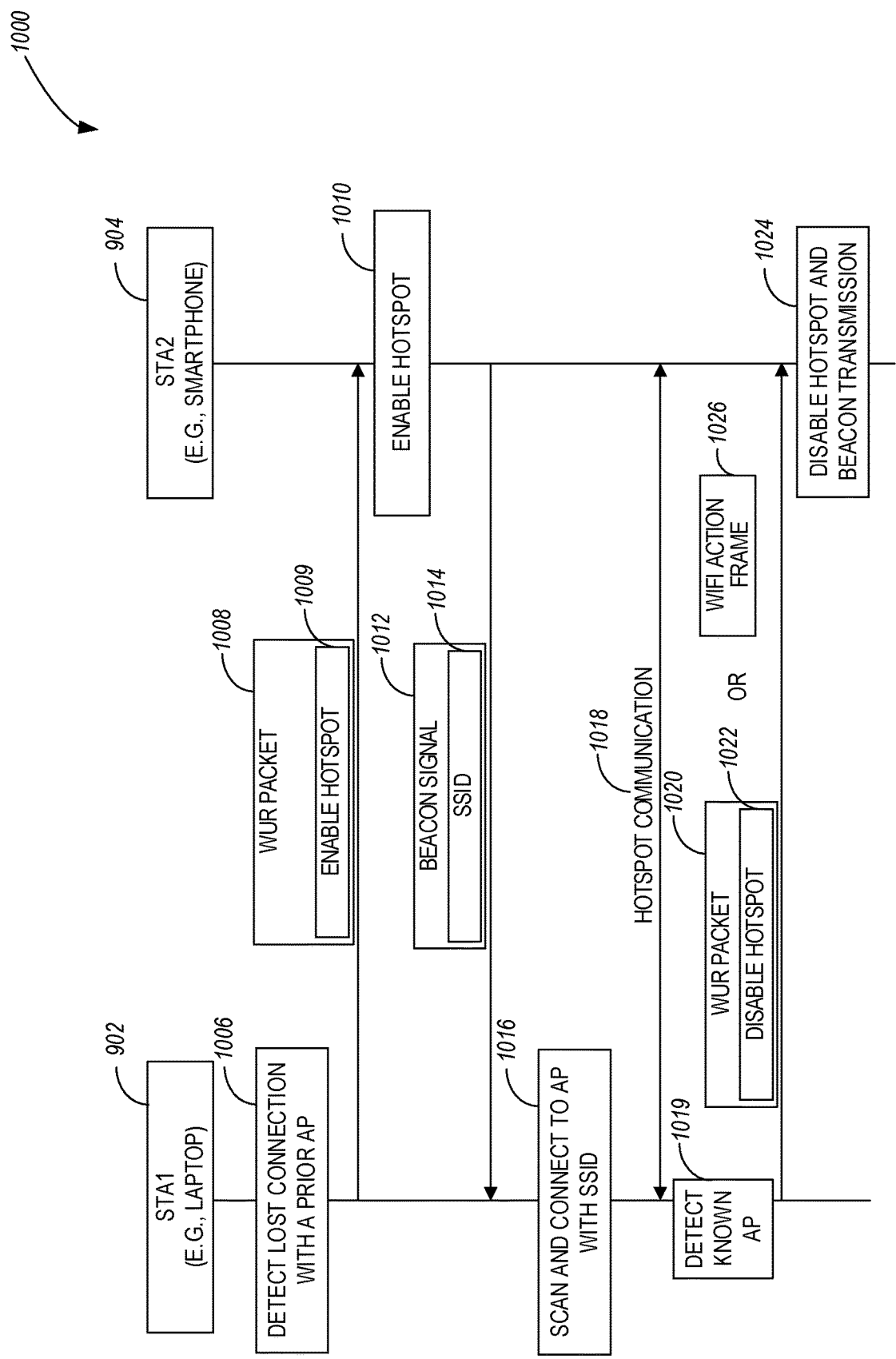
FIG. 10 illustrates a timing diagram of the example communication sequence of FIG. 9, in accordance with some embodiments.

FIG. 10 illustrates a timing diagram of the example communication sequence of FIG. 9, in accordance with some embodiments. Referring to FIG. 9 and FIG. 10, at operation 1006, STA 902 may detect a lost connection with a prior access point. For example, STA 902 may lose a connection with a home access point that both STA1 and STA2 were connected to.

When STA 904 is out of Wi-Fi coverage of the prior access point, and there are no other APs to connect to, STA 904 may transmit a WUR packet 906 (or 1008) to STA 904. The WUR packet 1008 may include an "enable hotspot" command, which can be configured in one of the different ways as discussed in connection with FIG. 14. In some aspects, the WUR packet 1008 can be a WUR Vendor Specific frame with the command "enable hotspot.". If STA 902 does not receive a beacon with the known SSID of the hotspot of STA 904, STA 902 may retransmit the WUR packet 1008 periodically.

In some aspects, STA 904 is equipped with a TGba compliant wake-up receiver and may become active when STA 904 loses the connection to the associated AP and there is no other/known APs to connect to.

When STA 904 receives the WUR packet 1008 through its wake-up receiver, the STA 904 may enable its wireless hotspot, at operation 1010, without user intervention. STA 904 may then initiate transmission of beacon signals 1012 with the SSID 1014 of the wireless hotspot.

At operation 1016, STA 902 may scan the communication channel, receive the beacon signal 1012 (or some other known token in the case of pre-registration) and connects to the wireless hotspot of STA 904 using the SSID 1014 provided in the beacon signal 1012. After connection with the hotspot is established, hotspot communication 1018 may take place between STA 902 and STA 904.

When a known access point is detected at operation 1019 (e.g., STA 902 moves into the coverage area of a known AP), STA 902 transmits a WUR packet 1020 with a disable hotspot command 1022 to STA 904. Alternatively, STA 902 may connect with the known AP and may transmit a Wi-Fi action frame 1026 with the disable hotspot command via the AP to STA 904. Upon receiving the command, at operation 1024, STA 904 may disable the hotspot and the beacon transmissions. STA 902 may retransmit the action frame with the command "disable hotspot" if STA 902 receives SSID 1014 of the hotspot after the transmission of the WUR packet 1020.

In some aspects, the auto-hotspot feature on STA 904 may be limited to pre-registered devices. In this case, part of the hotspot feature-setup in STA 904 may have an option to enable WUR auto-connect feature. In some aspects, the set of registered devices could be, for example, any device that has previously connected to the wireless hotspot of STA 904, or by selection. In some aspects, the WUR auto-connect feature could also enable/disabled at the STA 902 (e.g., the connected device) side.

In some aspects, during a preregistration phase, STAs 902 and 904 can negotiate parameters that can be used for automatic authentication and enablement or disablement of the wireless hotspot. For example, STA 902 may provide a WUR receiver (WURx) address to STA 904, which WURx address may be included by STA 902 in the WUR packet 1008 to assist STA 904 with authenticating STA 902 as the hotspot requesting STA as well as to determine whether or not to enable the hotspot for STA 902 based on preregistration configurations. Other authentication and automatic tethering related information may also be exchanged during the preregistration phase.

Figure 11:
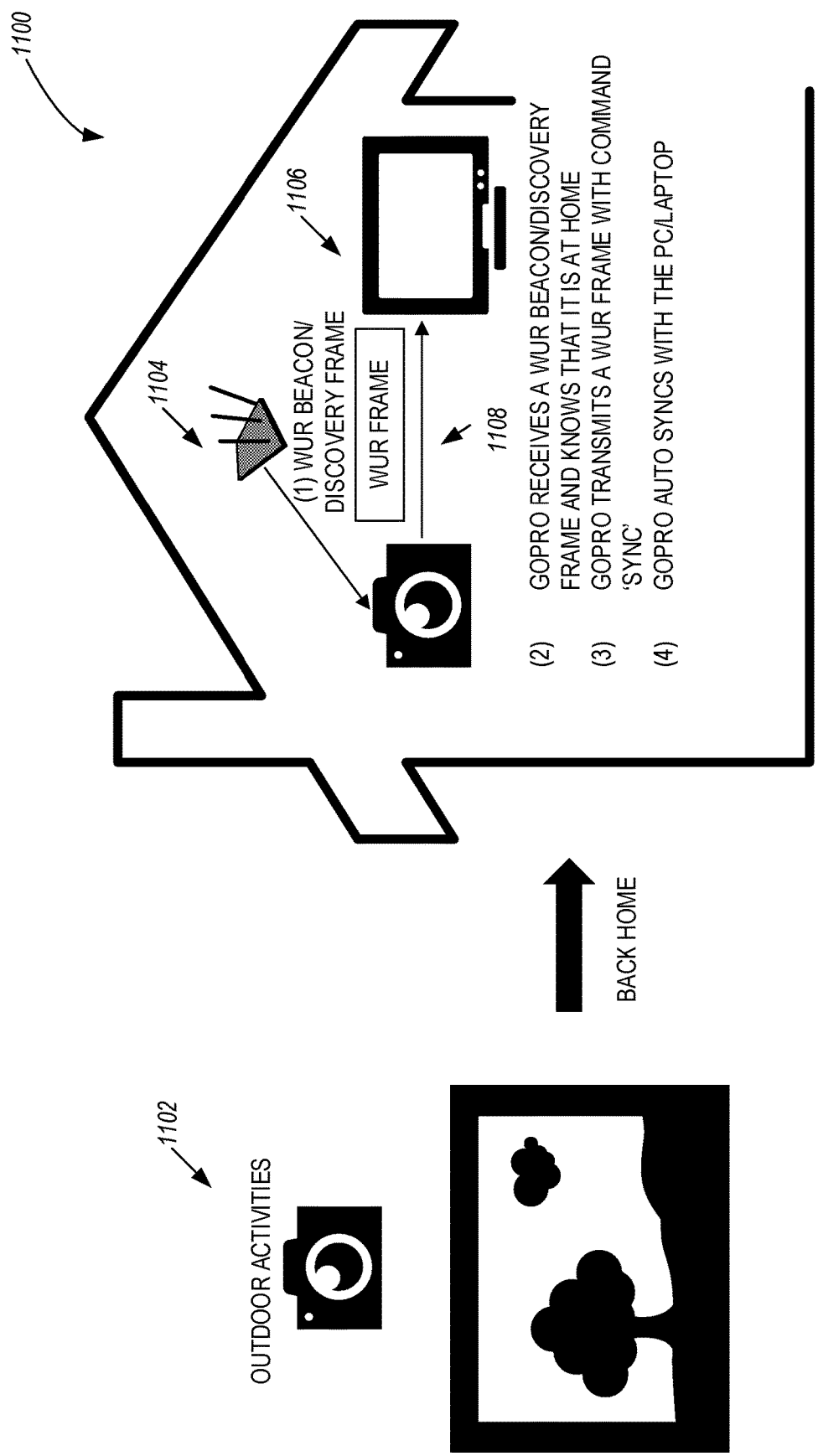
FIG. 11 illustrates an example communication sequence for connection to a peripheral device that supports WUR communications, in accordance with some embodiments.

FIG. 11 illustrates an example communication sequence 1100 for connection to a peripheral device that supports WUR communications, in accordance with some embodiments. Referring to FIG. 11, camera 1102 (STA1) may be used for outdoor activities and after the user returns to a home location (including a home access point 1104, or AP, and a laptop 1106, or STA2), STA1 receives a WUR beacon or discovery frame from AP 1104 and detects that it is located within a home environment associated with AP 1104. STA1 transmits a WUR frame with a synchronization command to STA2, which initiates the automatic sinking of data between STA1 and STA2.

Figure 12:
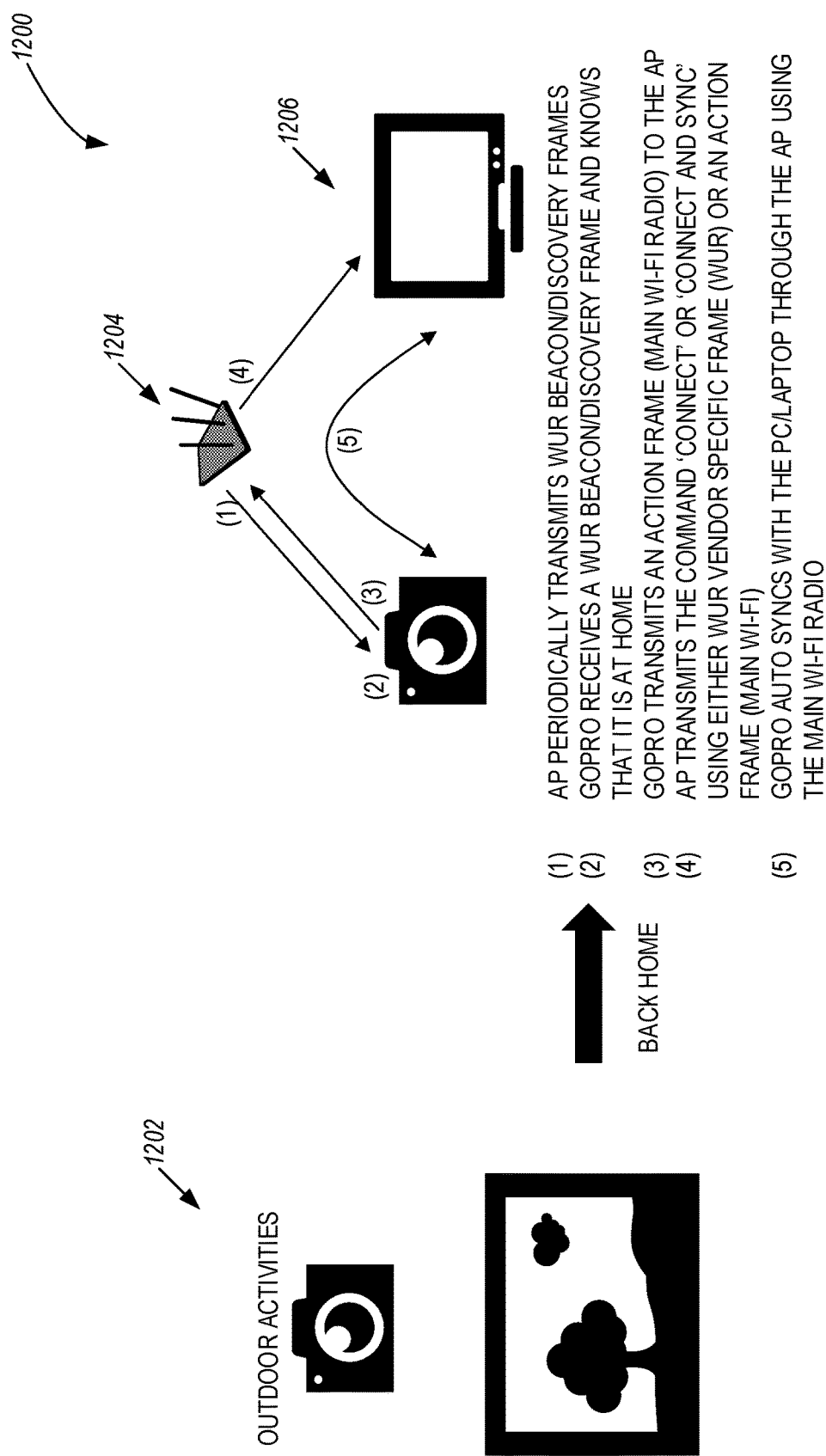
FIG. 12 illustrates an example communication sequence for connection to a peripheral device that does not support WUR communications, in accordance with some embodiments.
Figure 13:
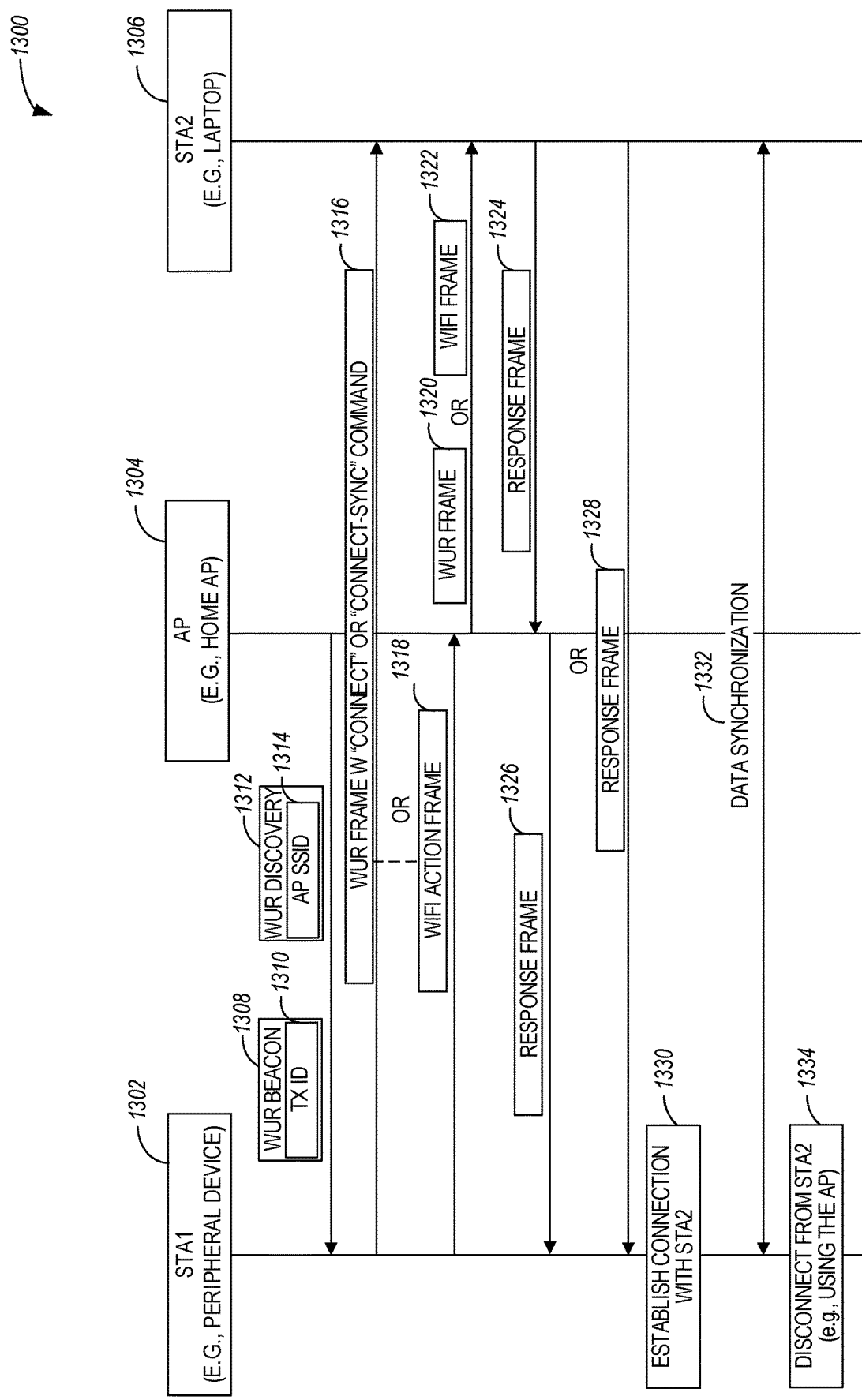
FIG. 13 illustrates a timing diagram of the example communication sequences of FIG. 11 and FIG. 12, in accordance with some embodiments.

FIG. 12 illustrates an example communication sequence 1200 for connection to a peripheral device that does not support WUR communications, in accordance with some embodiments. Referring to FIG. 12, camera 1202 (STA1) may be used for outdoor activities and after the user returns to a home location (including a home access point 1204, or AP, and a laptop 1206, or STA2), AP 1204 periodically transmits a WUR beacon/discovery frames. STA1 receives a WUR beacon/discovery frame and detects that it is located within a home environment associated with AP 1204. Since STA1 does not have the ability to communicate WUR frames, STA1 transmits an action frame (e.g., via its main Wi-Fi radio) to AP 1204. AP 1204 transmits a connect command (or connect and sync command) using either WUR frame or an action frame communicated to STA2. As a result, STA1 performs out of synchronization with STA2 via the AP and using its main Wi-Fi radio.

The automatic peripheral synchronization use case is discussed hereinbelow and in connection with FIG. 13. FIG. 13 illustrates a timing diagram 1300 of the example communication sequences of FIG. 11 and FIG. 12, in accordance with some embodiments. Referring to FIG. 13, the illustrated communication sequences take place between STA1 1302 (e.g., a peripheral device such as a camera), AP 1304 (e.g., a home access point), and STA2 (e.g., a laptop for another device with WUR communication capabilities).

Initially, AP 1304 transmits the WUR beacon frame 1308 with the transmit ID 1310 or the WUR discovery frame 1312 with the compressed SSID that is associated with AP 1304. STA1 1302 may be equipped with a TGba-compliant wake-up receiver and is active.

When STA1 1302 receives the WUR beacon 1308 or the WUR discovery frame 1312 from AP 1304, STA1 transmits to AP 1304 and STA2 a WUR frame (or packet) 1316, with the command "connect" or "connect and sync". STA1 may turn off the wake-up receiver. When STA1 does not receive the WUR beacon 1308, STA1 turns on its wake-up receiver.

Alternatively, when STA1 receives the WUR beacon 1308 or the WUR discovery frame 1312 from AP 1304, STA1 turns on the main Wi-Fi radio and transmits an action frame 1318 with the command "connect" or "connect and sync" to the AP. The AP then transmits the WUR frame 1320 with the command "connect" or "connect and sync" to STA2 (e.g., a home network device/laptop) if STA2 is capable of receiving the WUR frame. If STA2 is not capable of receiving the WUR frame but is able to receive Wi-Fi frames (i.e., 802.11n/ac/ax frames), the AP uses the main Wi-Fi radio to transmit an action frame 1322 with the command "connect" or "connect and sync" to STA2. If STA2 is connected through Ethernet or USB, the AP may transmit an Ethernet or USB command to STA2.

STA1 may wait for a response frame from STA2 via the main Wi-Fi radio (i.e., 802.11n/ac/ax). The response frame may be transmitted by the AP on behalf of STA2 (e.g., response frame transmissions 1324 and 1326) if the home network device is connected to the AP through Ethernet or USB. If STA1 does not receive a response frame within a timeout period, the device may retransmit the WUR frame.

If STA1 receives a response frame (e.g., 1328) directly from STA2 (e.g., through the main Wi-Fi radio), STA1 connects to STA2 at operation 1330 and performs data synchronization 1332 automatically, without user intervention.

Once the sync between STA1 and STA2 is complete, STA1 disconnects from STA2 at operation 1334.

In some aspects, STA2 may be equipped with a TGba-compliant wake-up receiver and may be active. Alternatively, if STA2 (such as a Home NAS) does not have Wi-Fi or WUR capabilities but is connected to the AP through Ethernet or USB, the AP may proxy the communications between STA1 and STA2.

When STA2 receives a WUR frame with the command "connect" or "connect and sync", STA2 transmits a response frame using the main Wi-Fi radio (e.g. 802.11n/ac/ax), connects with STA1, and performs the sync operation without any user intervention. If STA2 is connected to AP 1304 through Ethernet/USB, the AP transmits the response frame using the main Wi-Fi radio on behalf of STA2.

Figure 14:
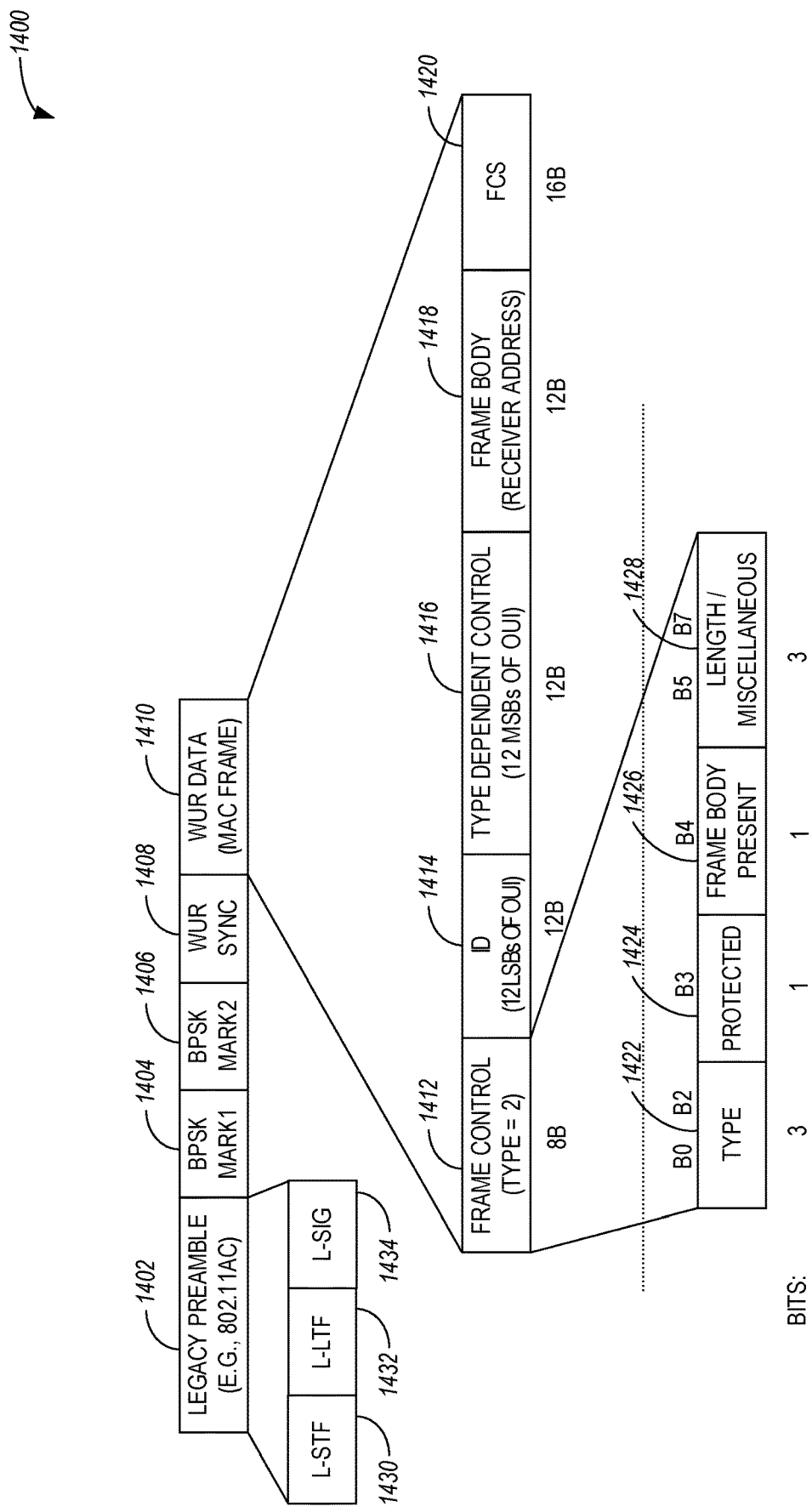
FIG. 14 is a block diagram of an example WUR packet which can be used in connection with disclosed techniques, in accordance with some embodiments.

FIG. 14 is a block diagram of an example WUR packet 1400 which can be used in connection with disclosed techniques, in accordance with some embodiments. Referring to FIG. 14, the WUR packet 1400 can include a BPSK Mark1 field 1404, BPSK Mark2 field 1406, WUR synchronization field 1408 and WUR data frame (or MAC frame) 1410.

Includes L-STF training field 1430, L-LTF training field 1432, and L-SIG signal field 1434.

The WUR data frame 1410 includes a friend control field 1412, and ID field 1414, a type-dependent control field 1416, a frame body field, and a frame check sequence (FCS) field 1420. The friend control field 1412 may include a type subfield 1422, a protected subfield 1424, a frame body present subfield 1426, and length/miscellaneous subfield 1428.

In some aspects, the WUR frame 1410 may be used to define an organizationally unique identifier (OUI) for the instant tethering operation or the automatic sync. More specifically, WUR frame 1410 may use the 12 LSBs in the ID field 1414 and the 12 MSBs in the type-dependent control field 1416.

In some aspects, the protected subfield 1424 and the miscellaneous subfield together (4 bits) to encode the WUR command. For example, encoded 0 may correspond to an "enable hotspot" command, an encoded 1 may correspond to a "disable hotspot" command, and an encoded 3 may correspond to a "connect and sync". In some aspects, other values may be reserved and other commands may be used as well. In some aspects, other values may be used to control the wireless devices (e.g., the smartphone providing hotspot capabilities) or initiate other actions in different usage scenarios (e.g., taking a photo, generating a notification or alarm, etc.).

In some aspects, the frame body present subfield 1426 may include the receiver (e.g., WURx) address (e.g., 12-bit). As previously mentioned hereinabove, the WURx address may be pre-negotiated between the two devices (e.g. laptop and smartphone or GoPro and PC).

In some aspects, the FCS 1420 calculation may include an embedded BSSID so that the receiver (e.g., the WURx) can identify the transmitter.

Figure 15:
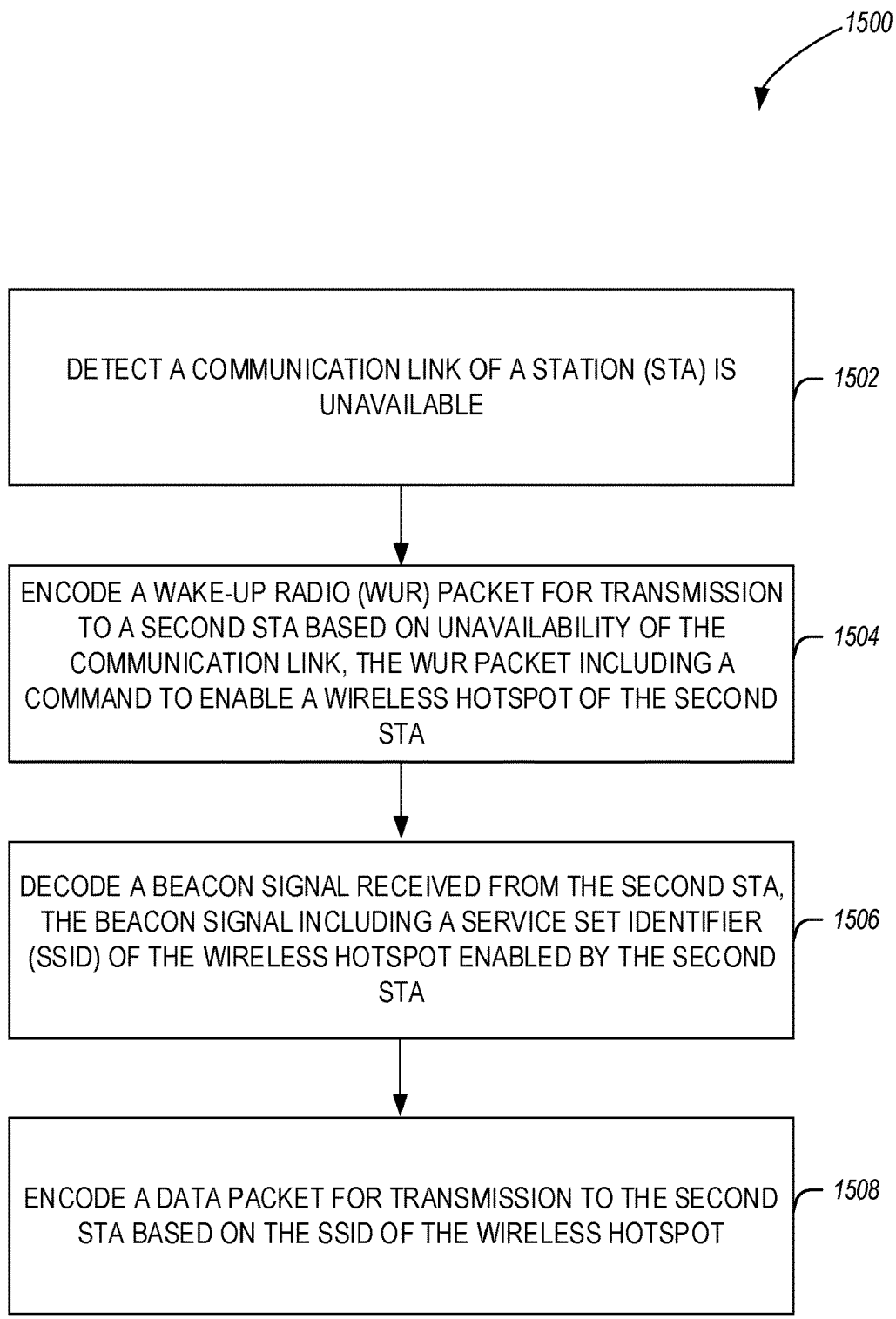
FIG. 15 and FIG. 16 are flow diagram of methods for instant tethering between wireless devices, in accordance with some embodiments.
Figure 16:
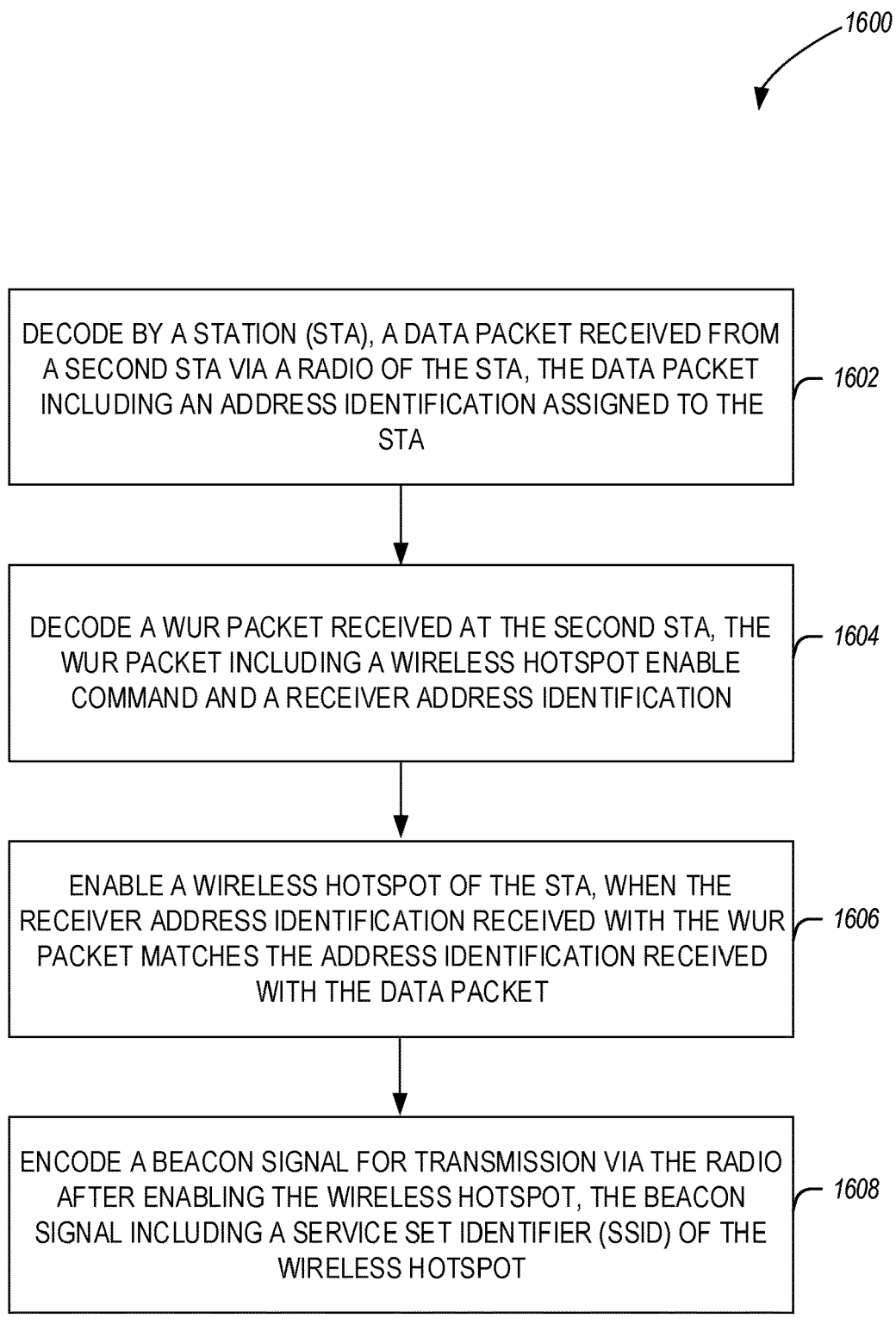

FIG. 15 and FIG. 16 are flow diagram of methods for instant tethering between wireless devices, in accordance with some embodiments. Referring to FIG. 15, the example method 1500 includes operations 1502, 1504, 1506, and 1508 which may be performed by STA1 902. At operation 1502, a communication link of a station (e.g., STA1) is detected as unavailable. For example, STA1 detects a lost connection with a prayer AP at operation 1006. At operation 1504, a wake-up radio (WUR) packet is encoded for transmission to a second STA (e.g., STA2 904) based on the unavailability of the communication link. For example, the packet may be transmitted to a WUR receiver (WURx) of STA2. For example, STA1 encodes a WUR packet 1008 for transmission to STA2. The WUR packet 1008 includes a command (e.g., 1009) to enable a wireless hotspot of STA2. At operation 1506, a beacon signal (e.g., 1012) received from STA2 is decoded. The beacon signal includes a service set identifier (e.g., SSID 1014) of the wireless hotspot enabled by STA2. At operation 1508, a data packet is encoded for transmission to STA2 based on the SSID of the wireless hotspot. For example, the communication exchange 1018 takes place after STA1 is connected to the wireless hotspot of STA2.

Referring to FIG. 16, the example method 1600 includes operations 1602, 1604, 1606, and 1608 which may be performed by STA2 904. At operation 1602, a data packet received from a second STA (e.g., STA1 902) via a radio of the STA (e.g., STA2). The data packet includes an address identification assigned to the STA. In some aspects, the data packet includes a wake-up radio (WUR) receiver (WURx) address identification assigned to the WURx of the STA. For example, STA1 902 may communicate the WURx address identification assigned to the WURx of STA2 904 during a preregistration phase.

At operation 1604, a WUR packet (e.g., 1008) received at the second STA (e.g., STA1 902) is decoded. The WUR packet includes a wireless hotspot enable command (e.g., 1009) and a receiver address identification.

At operation 1606, a wireless hotspot of the STA is enabled (e.g., at operation 1010), when the receiver address identification received with the WUR packet matches the address identification received with the data packet. At operation 1608, a beacon signal (e.g., 1012) is encoded for transmission via the radio after enabling the wireless hotspot, the beacon signal including a service set identifier (SSID) (e.g., 1014) of the wireless hotspot.

Figure 17:
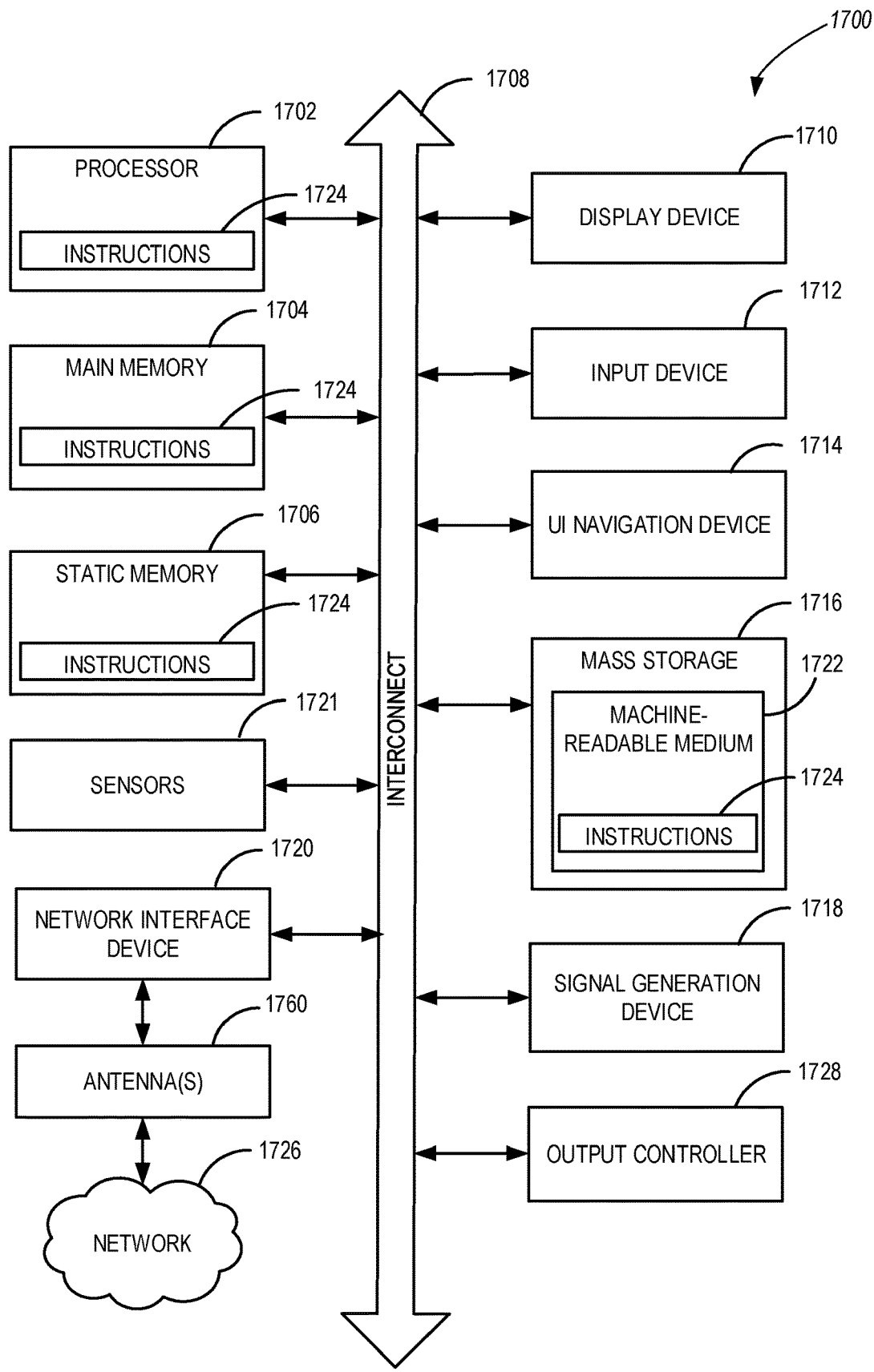
FIG. 17 illustrates a block diagram of an example machine upon which any one or more of the operations/techniques (e.g., methodologies) discussed herein may perform.

FIG. 17 illustrates a block diagram of an example machine 1700 upon which any one or more of the techniques (e.g., methodologies) discussed herein may perform. In alternative embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in peer-to-peer (P2P) (or other distributed) network environment. The machine 1700 may be a HE AP 502, HE station 504, personal computer (PC), a tablet PC, a set-top box (STB), a personal digital assistant (PDA), a portable communications device, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708.

Specific examples of main memory 1704 include Random Access Memory (RAM), and semiconductor memory devices, which may include, in some embodiments, storage locations in semiconductors such as registers. Specific examples of static memory 1706 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1700 may further include a display device 1710, an input device 1712 (e.g., a keyboard), and a user interface (UI) navigation device 1714 (e.g., a mouse). In an example, the display device 1710, input device 1712 and UI navigation device 1714 may be a touch screen display. The machine 1700 may additionally include a mass storage (e.g., drive unit) 1716, a signal generation device 1718 (e.g., a speaker), a network interface device 1720, and one or more sensors 1721, such as a global positioning system (GPS) sensor, compass, accelerometer, or other sensor. The machine 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 1702 and/or instructions 1724 may comprise processing circuitry and/or transceiver circuitry.

The storage device 1716 may include a machine-readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within static memory 1706, or within the hardware processor 1702 during execution thereof by the machine 1700. In an example, one or any combination of the hardware processor 1702, the main memory 1704, the static memory 1706, or the storage device 1716 may constitute machine-readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine-readable medium 1722 is illustrated as a single medium, the term "machine-readable medium" may include a single medium or multiple media (e.g., a centralized or distributed database, and/or associated caches and servers) configured to store the one or more instructions 1724.

An apparatus of the machine 1700 may be one or more of a hardware processor 1702 (e.g., a central processing unit (CPU), a graphics processing unit (GPU), a hardware processor core, or any combination thereof), a main memory 1704 and a static memory 1706, sensors 1721, network interface device 1720, antennas 1760, a display device 1710, an input device 1712, a UI navigation device 1714, a mass storage 1716, instructions 1724, a signal generation device 1718, and an output controller 1728. The apparatus may be configured to perform one or more of the methods and/or operations disclosed herein. The apparatus may be intended as a component of the machine 1700 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine-readable medium examples may include solid-state memories and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 1724 may further be transmitted or received over a communications network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1720 may include one or more physical jacks (e.g., Ethernet, coaxial, or phone jacks) or one or more antennas to connect to the communications network 1726. In an example, the network interface device 1720 may include one or more antennas 1760 to wirelessly communicate using at least one of single-input multiple-output (SIMO), multiple-input multiple-output (MIMO), or multiple-input single-output (MISO) techniques. In some examples, the network interface device 1720 may wirelessly communicate using Multiple User MIMO techniques. The term "transmission medium" shall be taken to include any intangible medium that is capable of storing, encoding or carrying instructions for execution by the machine 1700, and includes digital or analog communications signals or other intangible media to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM);

random access memory (RAM); magnetic disk storage media; optical storage media; flash memory, etc.

Figure 18:
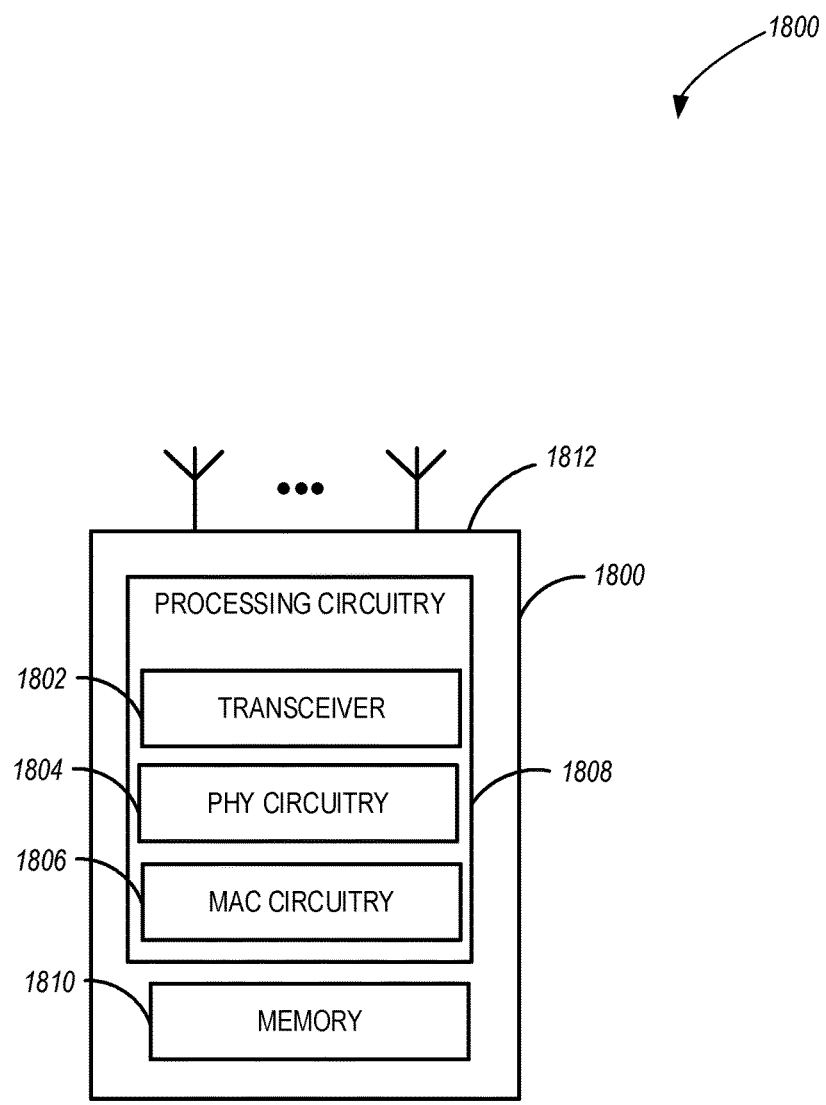
FIG. 18 illustrates a block diagram of an example wireless device upon which any one or more of the techniques (e.g., methodologies or operations) discussed herein may perform.

FIG. 18 illustrates a block diagram of an example wireless device 1800 upon which any one or more of the techniques (e.g., methodologies or operations) discussed herein may perform. The wireless device 1800 may be a HE device. The wireless device 1800 may be a HE STA 504 and/or HE AP 502 (e.g., FIG. 5). A HE STA 504 and/or HE AP 502 may include some or all of the components shown in FIGS. 1-5 and 18. The wireless device 1800 may be an example machine 1700 as disclosed in conjunction with FIG. 17, and may include a master device (e.g., a laptop or another computing device) or a slave device (e.g., a computing device coupled to the master device, such as a LE HID-type device or another type of wired or wireless computing device) configured to perform the discussed functionalities (e.g., in connection with FIGS. 6-16).

The wireless device 1800 may include processing circuitry 1808. The processing circuitry 1808 may include a transceiver 1802, physical layer circuitry (PHY circuitry) 1804, and MAC layer circuitry (MAC circuitry) 1806, one or more of which may enable transmission and reception of signals to and from other wireless devices 1800 (e.g., RE AP 502, HE STA 504, and/or legacy devices 506) using one or more antennas 1812. As an example, the PHY circuitry 1804 may perform various encoding and decoding functions that may include the formation of baseband signals for transmission and decoding of received signals. As another example, the transceiver 1802 may perform various transmission and reception functions such as the conversion of signals between a baseband range and a Radio Frequency (RF) range.

Accordingly, the PHY circuitry 1804 and the transceiver 1802 may be separate components or may be part of a combined component, e.g., processing circuitry 1808. In addition, some of the described functionality related to transmission and reception of signals may be performed by a combination that may include one, any or all of the PHY circuitry 1804 the transceiver 1802, MAC circuitry 1806, memory 1810, and other components or layers. The MAC circuitry 1806 may control access to the wireless medium. The wireless device 1800 may also include memory 1810 arranged to perform the operations described herein, e.g., some of the operations described herein may be performed by instructions stored in the memory 1810.

The antennas 1812 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1812 may be effectively separated to take advantage of spatial diversity and the different channel characteristics that may result.

One or more of the memory 1810, the transceiver 1802, the PHY circuitry 1804, the MAC circuitry 1806, the antennas 1812, and/or the processing circuitry 1808 may be coupled with one another. Moreover, although memory 1810, the transceiver 1802, the PHY circuitry 1804, the MAC circuitry 1806, the antennas 1812 are illustrated as separate components, one or more of memory 1810, the transceiver 1802, the PHY circuitry 1804, the MAC circuitry 1806, the antennas 1812 may be integrated in an electronic package or chip.

In some embodiments, the wireless device 1800 may be a mobile device as described in conjunction with FIG. 18. In some embodiments, the wireless device 1800 may be configured to operate in accordance with one or more wireless communication standards as described herein (e.g., as described in conjunction with FIGS. 1-5 and 17, IEEE 802.11). In some embodiments, the wireless device 1800 may include one or more of the components as described in conjunction with FIG. 18 (e.g., display device 1810, input device 1812, etc.) Although the wireless device 1800 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 1800 may include various components of the wireless device 1800 as shown in FIG. 18 and/or components from FIGS. 1-5 and 17. Accordingly, techniques and operations described herein that refer to the wireless device 1800 may be applicable to an apparatus for a wireless device 1800 (e.g., HE AP 502 and/or HE STA 504), in some embodiments. In some embodiments, the wireless device 1800 is configured to decode and/or encode signals, packets, and/or frames as described herein, e.g., PPDUs.

In some embodiments, the MAC circuitry 1806 may be arranged to contend for a wireless medium during a contention period to receive control of the medium for a HE TXOP and encode or decode a HE PPDU. In some embodiments, the MAC circuitry 1806 may be arranged to contend for the wireless medium based on channel contention settings, a transmitting power level, and a clear channel assessment level (e.g., energy detect level).

The PHY circuitry 1804 may be arranged to transmit signals in accordance with one or more communication standards described herein. For example, the PHY circuitry 1804 may be configured to transmit a HE PPDU. The PHY circuitry 1804 may include circuitry for modulation/demodulation, upconversion/downconversion, filtering, amplification, etc. In some embodiments, the processing circuitry 1808 may include one or more processors. The processing circuitry 1808 may be configured to perform functions based on instructions being stored in a RANI or ROM, or based on special-purpose circuitry. The processing circuitry 1808 may include a processor such as a general-purpose processor or special-purpose processor. The processing circuitry 1808 may implement one or more functions associated with antennas 1812, the transceiver 1802, the PHY circuitry 1804, the MAC circuitry 1806, and/or the memory 1810. In some embodiments, the processing circuitry 1808 may be configured to perform one or more of the functions/operations and/or methods described herein.

In mmWave technology, communication between a station (e.g., the HE stations 504 of FIG. 5 or wireless device 1800) and an access point (e.g., the HE AP 502 of FIG. 5 or wireless device 1800) may use associated effective wireless channels that are highly directionally dependent. To accommodate the directionality, beamforming techniques may be utilized to radiate energy in a certain direction with a certain beam width to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in Omni-directional propagation.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof) or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $\frac{1}{10}$ of a wavelength or more.

Additional Notes and Examples

Example 1 is an apparatus of a station (STA), the apparatus comprising: memory; and processing circuitry coupled to the memory, the processing circuitry to: detect a communication link of the STA is unavailable; encode a wake-up radio (WUR) packet for transmission to a second STA based on unavailability of the communication link, the WUR packet including a command to enable a wireless hotspot of the second STA; decode a beacon signal received from the second STA, the beacon signal including a service set identifier (SSID) of the wireless hotspot enabled by the second STA; and encode a data packet for transmission to the second STA based on the SSID of the wireless hotspot.

In Example 2, the subject matter of Example 1 includes, wherein the processing circuitry is further configured to: encode a first portion of the WUR packet to include an address identifier of the second STA; and encode a second portion of the WUR packet to include the command to enable the wireless hotspot.

In Example 3, the subject matter of Example 2 includes, wherein the first portion is a frame body field of the WUR packet, and the second portion includes a plurality of bits within a frame control field of the WUR packet.

In Example 4, the subject matter of Example 3 includes, wherein the second portion includes a plurality of bits within a protected subfield and miscellaneous subfield of the frame control field.

In Example 5, the subject matter of Examples 2-4 includes, wherein the processing circuitry is further configured to: generate the address identifier of the second STA during a registration communication exchange with the second STA using a primary connectivity radio, the registration communication exchange taking place prior to the detecting the communication link is unavailable; and encode the generated address identifier for transmission to the second STA using the primary connectivity radio.

In Example 6, the subject matter of Examples 1-5 includes, wherein the processing circuitry is further configured to: encode the command to enable the wireless hotspot within multiple fields of a media access control (MAC) frame of the WUR packet.

In Example 7, the subject matter of Example 6 includes, wherein the multiple fields include least-significant bits of an ID field and most-significant bits of a type-dependent control field of the MAC frame of the WUR packet.

In Example 8, the subject matter of Examples 1-7 includes, wherein the processing circuitry is further configured to: detect the communication link of the STA is available; and encode a second WUR packet for transmission to the second STA, the second WUR packet including a command to disable the wireless hotspot of the second STA.

In Example 9, the subject matter of Examples 1-8 includes, wherein the processing circuitry is further configured to: detect the communication link of the STA is available; and encode an action frame for transmission to the second STA using a primary connectivity radio, the action frame including a command to disable the wireless hotspot of the second STA.

In Example 10, the subject matter of Examples 1-9 includes, transceiver circuitry coupled to the processing circuitry; and one or more antennas coupled to the transceiver circuitry.

Example 11 is a non-transitory computer-readable medium comprising instructions to cause a station (STA), upon execution of the instructions by processing circuitry of the STA, to: detect a communication link of the STA is unavailable; encode a wake-up radio (WUR) packet for transmission to a second STA based on unavailability of the communication link, the WUR packet including a command to enable a wireless hotspot of the second STA; decode a beacon signal received from the second STA, the beacon signal including a service set identifier (SSID) of the wireless hotspot enabled by the second STA; and encode a data packet for transmission to the second STA based on the SSID of the wireless hotspot.

In Example 12, the subject matter of Example 11 includes, wherein the instructions further cause the STA to: encode a first portion of the WUR packet to include an address identifier of the second STA; and encode a second portion of the WUR packet to include the command to enable the wireless hotspot.

In Example 13, the subject matter of Example 12 includes, wherein the first portion is a frame body field of the WUR packet, and the second portion includes a plurality of bits within a frame control field of the WUR packet.

In Example 14, the subject matter of Example 13 includes, wherein the second portion includes a plurality of bits within a protected subfield and miscellaneous subfield of the frame control field.

In Example 15, the subject matter of Examples 12-14 includes, wherein the instructions further cause the STA to: generate the address identifier of the second STA during a registration communication exchange with the second STA using a primary connectivity radio, the registration communication exchange taking place prior to the detecting the communication link is unavailable; and encode the generated address identifier for transmission to the second STA using the primary connectivity radio.

In Example 16, the subject matter of Examples 11-15 includes, wherein the instructions further cause the STA to: encode the command to enable the wireless hotspot within multiple fields of a media access control (MAC) frame of the WUR packet.

In Example 17, the subject matter of Example 16 includes, wherein the multiple fields include least-significant bits of an ID field and most-significant bits of a type-dependent control field of the MAC frame of the WUR packet.

Example 18 is a method for communication using wake-up radios, the method comprising: detecting a communication link of a station (STA) is unavailable; encoding a wake-up radio (WUR) packet for transmission to a second STA based on unavailability of the communication link, the WUR packet including a command to enable a wireless hotspot of the second STA; decoding a beacon signal received from the second STA, the beacon signal including a service set identifier (SSID) of the wireless hotspot enabled by the second STA; and encoding a data packet for transmission to the second STA based on the SSID of the wireless hotspot.

In Example 19, the subject matter of Example 18 includes, encoding the command to enable the wireless hotspot within an ID field and a type-dependent control field of a media access control (MAC) frame of the WUR packet.

In Example 20, the subject matter of Examples 18-19 includes, detecting the communication link of the STA is available; and encoding a second WUR packet for transmission to the second STA, the second WUR packet including a command to disable the wireless hotspot of the second STA.

In Example 21, the subject matter of Examples 18-20 includes, detecting the communication link of the STA is available; and encoding an action frame for transmission to the second STA using a primary connectivity radio, the action frame including a command to disable the wireless hotspot of the second STA.

Example 22 is an apparatus of a station (STA), the apparatus comprising: memory; and processing circuitry coupled to the memory, the processing circuitry to: decode a data packet received from a second STA via a primary connectivity radio of the STA, the data packet including an address identification assigned to the STA; decode a WUR packet received at the second STA, the WUR packet including a wireless hotspot enable command and a receiver address identification; enable a wireless hotspot of the STA, when the receiver address identification received with the WUR packet matches the address identification received with the data packet; and encode a beacon signal for transmission via the primary connectivity radio after enabling the wireless hotspot, the beacon signal including a service set identifier (SSID) of the wireless hotspot.

In Example 23, the subject matter of Example 22 includes, wherein the processing circuitry is further configured to: decode a second WUR packet received at the second STA, the second WUR packet including a wireless hotspot disable command; and disable the wireless hotspot of the STA based on the wireless hotspot disable command.

In Example 24, the subject matter of Examples 22-23 includes, wherein the processing circuitry is further configured to: decode a first portion of the WUR packet to obtain the receiver address identification; and decode a second portion of the WUR packet to obtain include the wireless hotspot enable command; wherein the first portion is a frame body field of the WUR packet, and the second portion includes a plurality of bits within a frame control field of the WUR packet.

In Example 25, the subject matter of Examples 22-24 includes, wherein the processing circuitry is further configured to: decode the wireless hotspot enable command using multiple fields of a media access control (MAC) frame of the WUR packet, wherein the multiple fields include least-significant bits of an ID field and most-significant bits of a type-dependent control field of the MAC frame of the WUR packet.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a station (STA), the apparatus comprising:
    memory; and
    processing circuitry coupled to the memory, the processing circuitry to:
        detect a communication link of the STA is unavailable;
        encode a wake-up radio (WUR) packet for transmission to a second STA based on unavailability of the communication link, the WUR packet including a command to enable a wireless hotspot of the second STA;
        decode a beacon signal received from the second STA, the beacon signal including a service set identifier (SSID) of the wireless hotspot enabled by the second STA; and
        encode a data packet for transmission to the second STA based on the SSID of the wireless hotspot.

2. The apparatus of claim 1, wherein the processing circuitry is further configured to:
    encode a first portion of the WUR packet to include an address identifier of the second STA; and
    encode a second portion of the WUR packet to include the command to enable the wireless hotspot.

3. The apparatus of claim 2, wherein the first portion is a frame body field of the WUR packet, and the second portion includes a plurality of bits within a frame control field of the WUR packet.

4. The apparatus of claim 3, wherein the second portion includes a plurality of bits within a protected subfield and miscellaneous subfield of the frame control field.

5. The apparatus of claim 2, wherein the processing circuitry is further configured to:
    generate the address identifier of the second STA during a registration communication exchange with the second STA using a primary connectivity radio, the registration communication exchange taking place prior to the detecting the communication link is unavailable; and
    encode the generated address identifier for transmission to the second STA using the primary connectivity radio.

6. The apparatus of claim 1, wherein the processing circuitry is further configured to:
    encode the command to enable the wireless hotspot within multiple fields of a media access control (MAC) frame of the WUR packet.

7. The apparatus of claim 6, wherein the multiple fields include least-significant bits of an ID field and most-significant bits of a type-dependent control field of the MAC frame of the WUR packet.

8. The apparatus of claim 1, wherein the processing circuitry is further configured to:
    detect the communication link of the STA is available; and
    encode a second WUR packet for transmission to the second STA, the second WUR packet including a command to disable the wireless hotspot of the second STA.

9. The apparatus of claim 1, wherein the processing circuitry is further configured to:
    detect the communication link of the STA is available; and
    encode an action frame for transmission to the second STA using a primary connectivity radio, the action frame including a command to disable the wireless hotspot of the second STA.

10. The apparatus of claim 1, further comprising:
    transceiver circuitry coupled to the processing circuitry; and
    one or more antennas coupled to the transceiver circuitry.

11. A non-transitory computer-readable medium comprising instructions to cause a station (STA), upon execution of the instructions by processing circuitry of the STA, to:
    detect a communication link of the STA is unavailable;
    encode a wake-up radio (WUR) packet for transmission to a second STA based on unavailability of the communication link, the WUR packet including a command to enable a wireless hotspot of the second STA;
    decode a beacon signal received from the second STA, the beacon signal including a service set identifier (SSID) of the wireless hotspot enabled by the second STA; and
    encode a data packet for transmission to the second STA based on the SSID of the wireless hotspot.

12. The non-transitory computer-readable medium of claim 11, wherein the instructions further cause the STA to:
    encode a first portion of the WUR packet to include an address identifier of the second STA; and
    encode a second portion of the WUR packet to include the command to enable the wireless hotspot.

13. The non-transitory computer-readable medium of claim 12, wherein the first portion is a frame body field of the WUR packet, and the second portion includes a plurality of bits within a frame control field of the WUR packet.

14. The non-transitory computer-readable medium of claim 13, wherein the second portion includes a plurality of bits within a protected subfield and miscellaneous subfield of the frame control field.

15. The non-transitory computer-readable medium of claim 12, wherein the instructions further cause the STA to:
    generate the address identifier of the second STA during a registration communication exchange with the second STA using a primary connectivity radio, the registration communication exchange taking place prior to the detecting the communication link is unavailable; and
    encode the generated address identifier for transmission to the second STA using the primary connectivity radio.

16. The non-transitory computer-readable medium of claim 11, wherein the instructions further cause the STA to:
    encode the command to enable the wireless hotspot within multiple fields of a media access control (MAC) frame of the WUR packet.

17. The non-transitory computer-readable medium of claim 16, wherein the multiple fields include least-significant bits of an ID field and most-significant bits of a type-dependent control field of the MAC frame of the WUR packet.

18. A method for communication using wake-up radios, the method comprising:
    detecting a communication link of a station (STA) is unavailable;
    encoding a wake-up radio (WUR) packet for transmission to a second STA based on unavailability of the communication link, the WUR packet including a command to enable a wireless hotspot of the second STA;
decoding a beacon signal received from the second STA, the beacon signal including a service set identifier (SSID) of the wireless hotspot enabled by the second STA; and
encoding a data packet for transmission to the second STA based on the SSID of the wireless hotspot.

19. The method of claim 18, further comprising:
encoding the command to enable the wireless hotspot within an ID field and a type-dependent control field of a media access control (MAC) frame of the WUR packet.

20. The method of claim 18, further comprising:
detecting the communication link of the STA is available; and
encoding a second WUR packet for transmission to the second STA, the second WUR packet including a command to disable the wireless hotspot of the second STA.

21. The method of claim 18, further comprising:
detecting the communication link of the STA is available; and
encoding an action frame for transmission to the second STA using a primary connectivity radio, the action frame including a command to disable the wireless hotspot of the second STA.

22. An apparatus of a station (STA), the apparatus comprising:
memory; and
processing circuitry coupled to the memory, the processing circuitry to:
decode a data packet received from a second STA via a primary connectivity radio of the STA, the data packet including an address identification assigned to the STA;
decode a WUR packet received at the second STA, the WUR packet including a wireless hotspot enable command and a receiver address identification;
enable a wireless hotspot of the STA, when the receiver address identification received with the WUR packet matches the address identification received with the data packet; and
encode a beacon signal for transmission via the primary connectivity radio after enabling the wireless hotspot, the beacon signal including a service set identifier (SSID) of the wireless hotspot.

23. The apparatus of claim 22, wherein the processing circuitry is further configured to:
decode a second WUR packet received at the second STA, the second WUR packet including a wireless hotspot disable command; and
disable the wireless hotspot of the STA based on the wireless hotspot disable command.

24. The apparatus of claim 22, wherein the processing circuitry is further configured to:
decode a first portion of the WUR packet to obtain the receiver address identification; and
decode a second portion of the WUR packet to obtain include the wireless hotspot enable command;
wherein the first portion is a frame body field of the WUR packet, and the second portion includes a plurality of bits within a frame control field of the WUR packet.

25. The apparatus of claim 22, wherein the processing circuitry is further configured to:
decode the wireless hotspot enable command using multiple fields of a media access control (MAC) frame of the WUR packet,
wherein the multiple fields include least-significant bits of an ID field and most-significant bits of a type-dependent control field of the MAC frame of the WUR packet.

* * * * *